(12) United States Patent
Norimatsu

(10) Patent No.: US 9,806,917 B2
(45) Date of Patent: Oct. 31, 2017

(54) ELECTRIC SIGNAL TRANSMISSION APPARATUS

(71) Applicant: HITACHI, LTD., Tokyo (JP)

(72) Inventor: Takayasu Norimatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/116,234

(22) PCT Filed: Feb. 21, 2014

(86) PCT No.: PCT/JP2014/054208
§ 371 (c)(1),
(2) Date: Aug. 3, 2016

(87) PCT Pub. No.: WO2015/125282
PCT Pub. Date: Aug. 27, 2015

(65) Prior Publication Data
US 2017/0019275 A1    Jan. 19, 2017

(51) Int. Cl.
*H03H 7/30* (2006.01)
*H04L 25/03* (2006.01)
*H04B 3/08* (2006.01)
*H04L 27/26* (2006.01)

(52) U.S. Cl.
CPC ......... *H04L 25/03057* (2013.01); *H04B 3/08* (2013.01); *H04L 25/03* (2013.01); *H04L 27/2614* (2013.01)

(58) Field of Classification Search
CPC .................................................. H04L 25/03057
USPC ........................................................ 375/233
See application file for complete search history.

(56) References Cited

U.S. PATENT DOCUMENTS

2007/0071084 A1    3/2007    Lai et al.
2010/0226421 A1    9/2010    Kibune

FOREIGN PATENT DOCUMENTS

JP    2001-044895 A    2/2001
JP    2007-097160 A    4/2007
WO    2009/047852 A1    4/2009

OTHER PUBLICATIONS

John F. Bulzacchelli et al., "A 28-Gb/s 4-Tap FFE/15-Tap DFE Serial Link Transceiver in 32-nm SOI CMOS Technology", IEEE Journal of Solid-State Circuits, Dec. 2012, pp. 3232-3248, vol. 47, No. 12.
International Search Report of PCT/JP2014/054208 dated Mar. 18, 2014.

*Primary Examiner* — Lihong Yu
(74) *Attorney, Agent, or Firm* — Mattingly & Malur, PC

(57) ABSTRACT

A decision feedback equalizer of an electric signal transmission apparatus has an average peak value determiner that receives an output of an adder and a threshold value set by a program. An average peak value of the output of the adder), compares a magnitude relation of the detected average peak value and the threshold value, increases the reference value of the output of a reference value generation circuit from an initial value set by the program and causes resolutions of DACs to become coarse from the initial value, when the average peak value is larger than the threshold value, and decreases the reference value of the output of the reference value generation circuit from the initial value set by the program and causes the resolutions of the DACs to become fine from the initial value, when the average peak value is smaller than the threshold value.

14 Claims, 21 Drawing Sheets

(a)

(b)

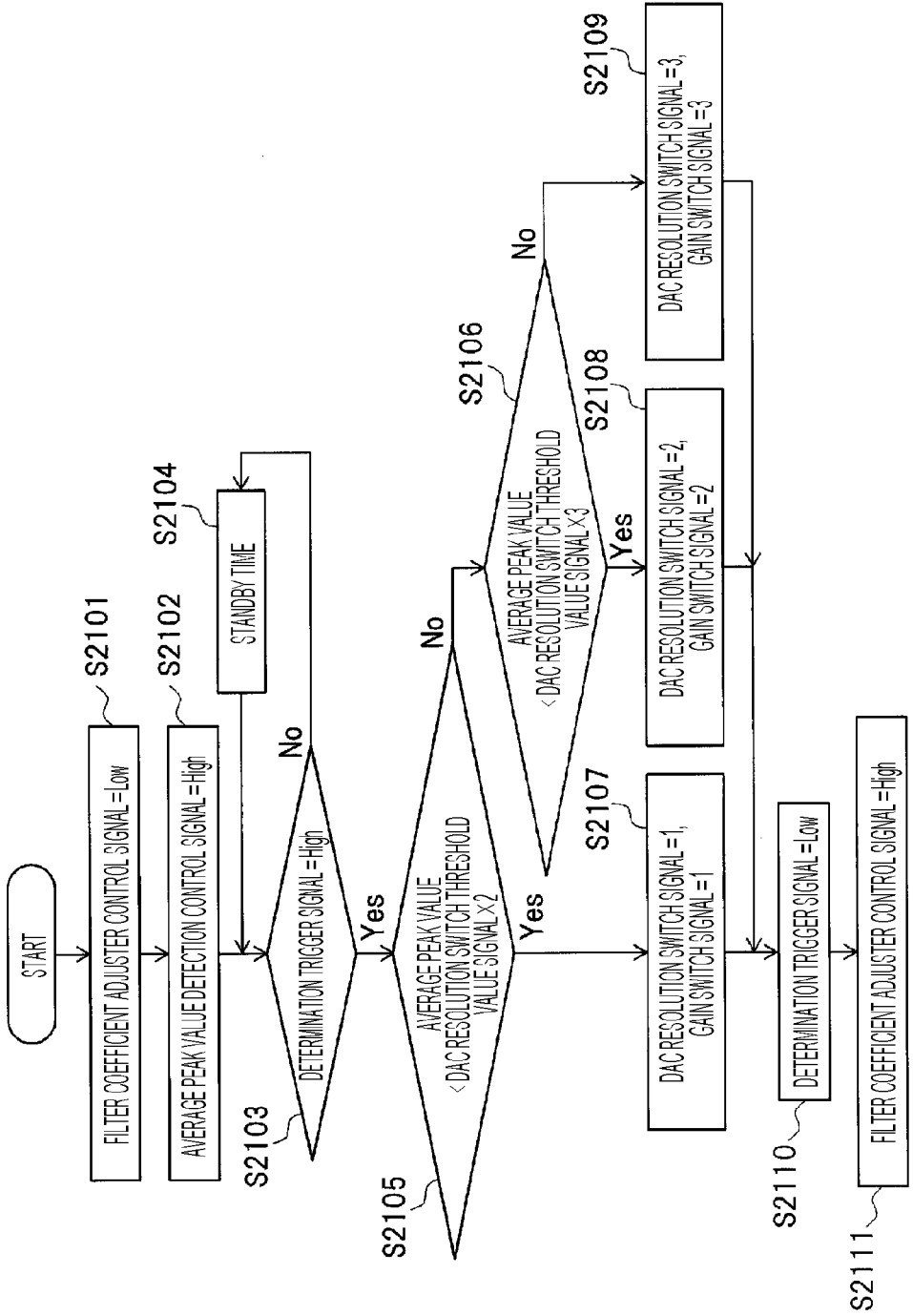

ELECTRIC SIGNAL TRANSMISSION APPARATUS

TECHNICAL FIELD

The present invention relates to an electric signal transmission apparatus. More specifically, the present invention relates to a receiver for high-speed wired transmission and a semiconductor integrated circuit device used for the receiver and particularly, to technology of a decision feedback equalizer that causes resolutions and ranges of digital-to-analog converters providing filter coefficients to be adapted for an apparatus environment.

BACKGROUND ART

Recently, technology for extracting correlation data from large-scale data called big data attracts attention and an increase of a data amount and improvement of a processing ability of an information apparatus are advanced. At this time, a communication speed inside an apparatus becoming a bottleneck of large-scale data processing and a communication speed outside the apparatus are also improved. For example, in communication outside the apparatus, correspondence to a standard such as 100G Ether and 32G FC is advanced and a speed increase to communication speeds of 25 Gbps and 28 Gbps per lane is advanced.

As the communication speed increases, an influence of reflection at a short distance is actualized and a frequency characteristic of a communication path does not become linear. In addition, a time of a unit interval (1UI) becomes short and an allowed amount of jitter decreases. For this reason, waveform equalization is performed using a feed forward equalizer (FFE) or a continuous time linear equalizer (CTLE) and the jitter by inter-symbol interference (ISI) is improved. However, the jitter is not compensated for. Therefore, a decision feedback equalizer (DFE) is often used to improve the ISI jitter (refer to NPL 1).

The DFE has a configuration of a digital filter and includes a plurality of taps obtained by multiplying filter coefficients by data, which are added to an input. The DFE can cancel an influence of a previous signal or an influence of reflection arriving late from a distance as much as the DFE increases the number of taps. If a frequency becomes high, a wavelength becomes short. For this reason, it is necessary to increase the number of taps of the DFE to cancel near reflection. Therefore, when the frequency increases, the number of taps of the DFE tends to increase.

CITATION LIST

Patent Literature

NPL 1: John F. bulzacchelli and et. al., "A 28-Gb/s 4-Tap FFE/15-Tap DFE Serial Link Transceiver in 32-nm SOI CMOS Technology", JSSC, Vol. 47, No. 12, December 2012

SUMMARY OF INVENTION

Technical Problem

However, in the technology using the DFE described above, if the speed of the information apparatus increases, the operation speed of the DFE also increases and a physical distance where equalization is enabled by the DFE decreases in the same number of taps. For this reason, the number of taps of the DFE necessary for compensating for the same distance tends to increase according to the operation speed and the number of digital-to-analog converters (DACs) to realize the taps increases. In addition, because lengths of communication paths in apparatuses are various and the communication paths are different according to the apparatuses, resolutions and ranges required for the DACs are different in the individual paths. For this reason, the DACs having fine resolutions and wide ranges are needed to correspond to a plurality of apparatuses and a plurality of communication paths, a size of each of the multiple DACs increases, and an area and consumption power increase.

Accordingly, the present invention has been made in view of the above problems and a representative object thereof is to provide technology for optimizing resolutions and ranges of digital-to-analog converters in accordance with a communication path.

The above and other objects and new features of the present invention will become apparent from the following description of embodiments with reference to the accompanying drawings.

Solution to Problem

An outline of a representative invention among inventions disclosed in the present application is described simply as follows.

That is, a representative electric signal transmission apparatus is an electric signal transmission apparatus having a decision feedback equalizer. The decision feedback equalizer has an adder that receives a reception signal and adds taps of filters to the reception signal, a comparator that determines the positive/negative of an output of the adder and outputs a determination result, a shift register that delays an output of the comparator by the integral multiple of a cycle of an input clock, a reference circuit that switches a reference value of an output according to an input control signal, digital-to-analog converters that execute digital-to-analog conversion on tap coefficients of the filters, and multipliers that output the taps of the filters obtained by multiplying outputs of the digital-to-analog converters and an output of the shift register to the adder. The decision feedback equalizer further has a filter coefficient adjuster that receives the output of the adder, the output of the comparator, and the output of the shift register, outputs the tap coefficients of the filters to the digital-to-analog converters, and adjusts the tap coefficients of the filters by a feedback loop. The decision feedback equalizer further has an average peak value determiner that receives the output of the adder and a threshold value set by a program, outputs a determination result as a control signal to the reference circuit, detects an average peak value of the output of the adder, compares a magnitude relation of the detected average peak value and the threshold value, increases the reference value of the output of the reference circuit from an initial value set by the program and causes resolutions of the digital-to-analog converters to become coarse from the initial value, when the average peak value is larger than the threshold value, and decreases the reference value of the output of the reference circuit from the initial value set by the program and causes the resolutions of the digital-to-analog converters to become fine from the initial value, when the average peak value is smaller than the threshold value.

Advantageous Effects of Invention

An effect obtained by a representative invention among inventions disclosed in the present application is simply described as follows.

That is, according to a representative effect, resolutions and ranges of digital-to-analog converters can be optimized in accordance with a communication path. As a result, an area and consumption power of a semiconductor integrated circuit device including a decision feedback equalizer can be suppressed.

BRIEF DESCRIPTION OF DRAWINGS

FIG. 22 is a diagram illustrating an example of an operation sequence of average peak value detection in the decision feedback equalizer in FIG. 18.

DESCRIPTION OF EMBODIMENTS

Figure 1:
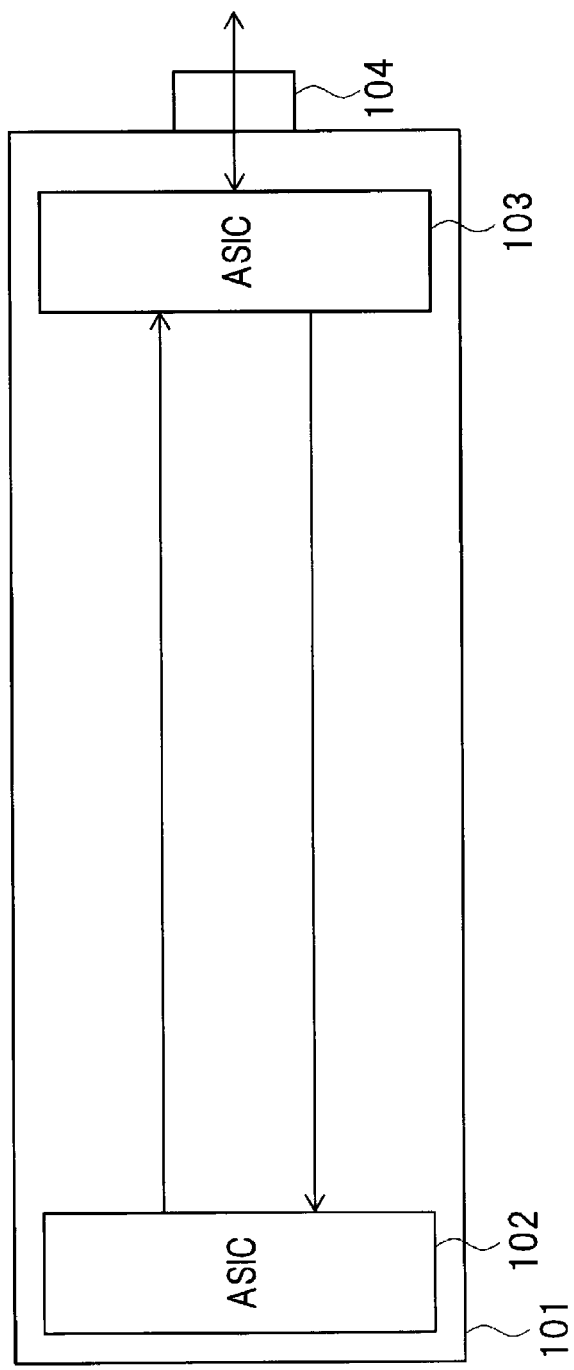
FIG. 1 is a diagram illustrating an example (an electric signal transmission apparatus on the same substrate) of a configuration of an electric signal transmission apparatus according to premise technology of an embodiment of the present invention.

In embodiments described below, the present invention will be described in a plurality of embodiments or sections when required as a matter of convenience. However, these sections or embodiments are not irrelevant to each other unless otherwise stated and one relates to the entire or part of the other as a modification, details, or a supplementary explanation thereof. In addition, in the embodiments described below, when referring to the number of elements (including the number of pieces, values, amounts, ranges, and the like), the number of the elements is not limited to a specific number unless otherwise stated or except for the case in which the number is apparently limited to a specific number in principle and the number larger or smaller than the specified number is also applicable.

In addition, in the embodiments described below, it goes without saying that components (including element steps and the like) are not always indispensable unless otherwise stated or except for the case in which the components are apparently indispensable in principle. Similarly, in the embodiments described below, when shapes of the components, a positional relation thereof, and the like are mentioned, the substantially approximate and similar shapes and the like are included therein unless otherwise stated or except for the case in which it is conceivable that they are not apparently excluded in principle. The same is applicable to the numerical values and the ranges described above.

Outline of Embodiment

First, an outline of an embodiment of the present invention will be described. In the outline of the embodiment, components and reference numerals corresponding to each embodiment are added to parentheses and description is given, for example.

A representative electric signal transmission apparatus of the embodiment is an electric signal transmission apparatus having a decision feedback equalizer (DFE 313). The decision feedback equalizer has an adder (adder 402) that receives a reception signal and adds taps of filters to the reception signal, a comparator (comparator 404) that determines the positive/negative of an output of the adder and outputs a determination result, a shift register (shift register 410) that delays an output of the comparator by the integral multiple of a cycle of an input clock, a reference circuit (reference value generation circuit 711) that switches a reference value of an output according to an input control signal, digital-to-analog converters (DACs 706 to 710) that execute digital-to-analog conversion on tap coefficients of the filters, and multipliers (multipliers 701 to 705) that output the taps of the filters obtained by multiplying outputs of the digital-to-analog converters and an output of the shift register to the adder. The decision feedback equalizer further has a filter coefficient adjuster (filter coefficient adjuster 700) that receives the output of the adder, the output of the comparator, and the output of the shift register, outputs the tap coefficients of the filters to the digital-to-analog converters, and adjusts the tap coefficients of the filters by a feedback loop. The decision feedback equalizer further an average peak value determiner (average peak value determiner 801) that receives the output of the adder and a threshold value set by a program, outputs a determination result as a control signal to the reference circuit, detects an average peak value of the output of the adder, compares a magnitude relation of the detected average peak value and the threshold value, increases the reference value of the output of the reference circuit from an initial value set by the program and causes resolutions of the digital-to-analog converters to become coarse from the initial value, when the average peak value is larger than the threshold value, and decreases the reference value of the output of the reference circuit from the initial value set by the program and causes the resolutions of the digital-to-analog converters to become fine from the initial value, when the average peak value is smaller than the threshold value.

That is, the present invention has the following characteristics as a means for resolving the problems of the background art described above. The present invention is an invention that relates to a decision feedback equalizer (DFE) that has a function of detecting an average peak value at an input of the DFE different in accordance with a communication path and adjusting ranges and resolutions of the digital-to-analog converters (DACs) adding the tap coefficients, on the basis of the average peak value.

For example, with a remainder obtained by subtracting a portion of ISI of which a skirt extends beyond 1UI from an input signal by the DFE as noise, the jitter is calculated by a ratio of a main signal to be a signal other than the noise and the noise. The average peak value shows the magnitude of the main signal. From a point of view of the jitter, when the magnitude of the signal increases, an allowed value of quantization noise of the DAC increases and the resolution of the DAC may be increased. In contrast, when the magnitude of the signal decreases, the allowed value of the quantization noise of the DAC decreases and the resolution of the DAC needs to be decreased. In addition, when the magnitude of the main signal increases, the height of the skirt of ISI increases as an absolute value. For this reason, when the average peak value of the input of the DFE increases, the tap coefficient of the DFE increases and the range of the DAC is widened and when the average peak value decreases, the tap coefficient of the DFE decreases and the range of the DAC is narrowed.

From the above examination, in the present invention, the average peak value of the input of the DFE is detected, a result thereof is used, the resolutions and the ranges necessary for the tap coefficients are used, and the resolutions and the ranges of the DACs adding the tap coefficients are optimized. In addition, the resolutions of the DACs are changed, so that gain of a loop for causing the tap coefficients to be adapted for optimal values according to an environment change such as a temperature is changed, and this affects convergence. For this reason, the present invention also has a function of decreasing the loop gain when the resolutions are increased and increasing the loop gain when the resolutions are decreased.

Each embodiment based on the outline of the embodiment will be described in detail below on the basis of the drawings. In all drawings to describe the embodiment, the same members are denoted with the same reference numerals in principle and repetitive description is omitted.

In addition, description is given below in comparison with premise technology of this embodiment to be a comparative example of this embodiment to facilitate understanding of a characteristic of this embodiment. First, the premise technology of this embodiment will be described.

Premise Technology of this Embodiment

An electric signal transmission apparatus according to the premise technology of this embodiment will be described using FIGS. 1 to 7.

<Electric Signal Transmission Apparatus>

Figure 2:
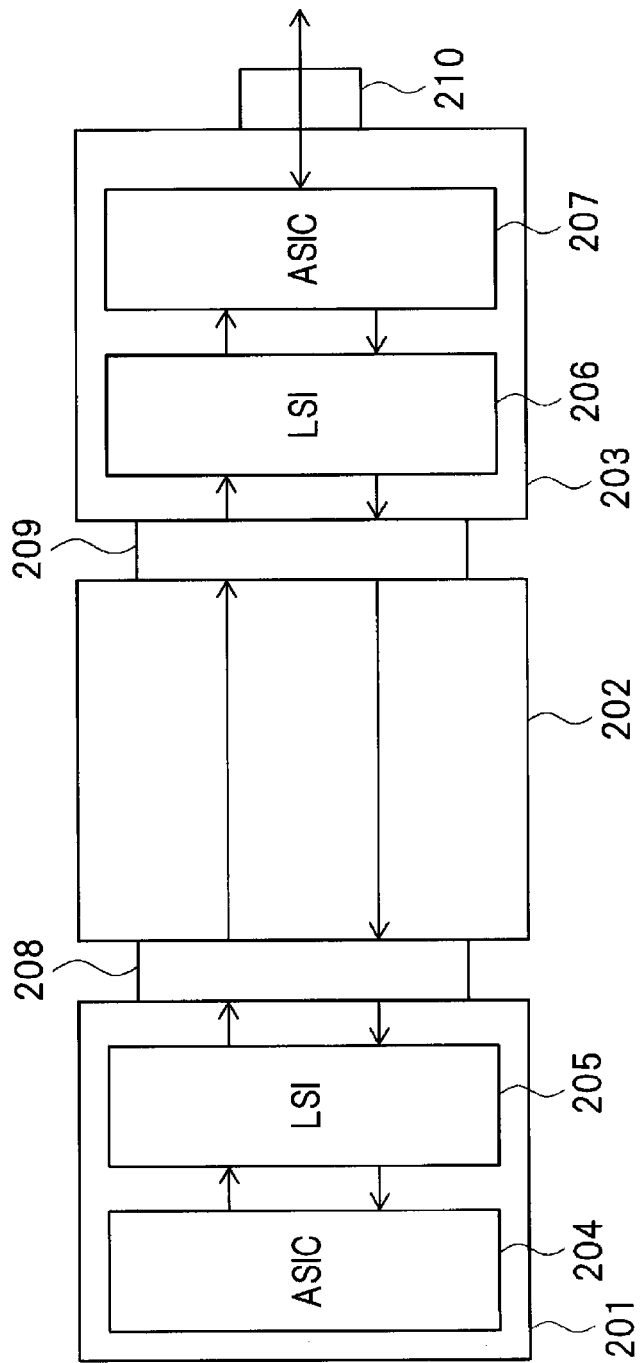
FIG. 2 is a diagram illustrating a different example (an electric signal transmission apparatus when repeaters are used in a plurality of substrates) of the configuration of the electric signal transmission apparatus according to the premise technology f the embodiment of the present invention.

First, the electric signal transmission apparatus according to the premise technology of this embodiment will be described using FIGS. 1 and 2. FIGS. 1 and 2 are diagrams illustrating examples of configurations of electric signal transmission apparatuses. FIG. 1 illustrates an electric signal transmission apparatus on the same substrate and FIG. 2 illustrates an electric signal transmission apparatus when repeaters are used in a plurality of substrates. The configurations of the electric signal transmission apparatuses illustrated in FIGS. 1 and 2 are the same in this embodiment to be described below.

The electric signal transmission apparatus illustrated in FIG. 1 is a configuration example of a high-speed wired transmission apparatus that is mounted on the same intra-apparatus substrate 101. The electric signal transmission apparatus has a semiconductor integrated circuit device (ASIC) 102 for signal processing, a semiconductor integrated circuit device (ASIC) 103 for communication, and a connector 104.

The semiconductor integrated circuit device 102 for the signal processing is a semiconductor integrated circuit device to execute the signal processing. The semiconductor integrated circuit device 103 for the communication is a semiconductor integrated circuit device to perform the communication. The connector 104 is a connection device to perform communication with a different apparatus.

In the electric signal transmission apparatus, the semiconductor integrated circuit device 102 for the signal processing, the semiconductor integrated circuit device 103 for the communication, and the connector 104 are mounted on the intra-apparatus substrate 101. In addition, the semiconductor integrated circuit device 102 for the signal processing and the semiconductor integrated circuit device 103 for the communication perform communication with each other and the semiconductor integrated circuit device 103 for the communication performs communication with a different apparatus via the connector 104.

For example, a signal output from the semiconductor integrated circuit device 102 for the signal processing is transmitted to the semiconductor integrated circuit device 103 for the communication and is transmitted to an external apparatus via the connector 104. In contrast, a signal received by the semiconductor integrated circuit device 103 for the communication from the external apparatus via the connector 104 is transmitted to the semiconductor integrated circuit device 102 for the signal processing.

The electric signal transmission apparatus illustrated in FIG. 2 is a configuration example of a high-speed wired transmission apparatus that is mounted on a plurality of (in an example of FIG. 2, two) intra-apparatus substrates 201 and 203, with an intra-apparatus transmission path substrate 202 therebetween. FIG. 2 illustrates an example of the case in which the communication in FIG. 1 is performed in the different intra-apparatus substrates 201 and 203 as well as the same intra-apparatus substrate 101 and the repeaters are mounted.

The electric signal transmission apparatus has a semiconductor integrated circuit device (ASIC) 204 for signal processing, a repeater (LSI) 205, a repeater 206 (LSI), a semiconductor integrated circuit device (ASIC) 207 for communication, and connectors 208, 209, and 210. The repeaters 205 and 206 are semiconductor integrated circuit devices to relay a signal.

In the electric signal transmission apparatus, the intra-apparatus substrate 201 on which the semiconductor integrated circuit device 204 for the signal processing and the repeater 205 are mounted and the intra-apparatus transmission path substrate 202 are connected via the connector 208. In addition, the intra-apparatus transmission path substrate 202 and the intra-apparatus substrate 203 on which the repeater 206, the semiconductor integrated circuit device 207 for the communication, and the connector 210 are mounted are connected via the connector 209. Similarly to a flow of the signal in FIG. 1, the semiconductor integrated circuit device 204 for the signal processing performs the communication with a different apparatus connected to the front of the connector 210 via the semiconductor integrated circuit device 207 for the communication.

For example, a signal output from the semiconductor integrated circuit device 204 for the signal processing is relayed by the repeater 205, passes through the connector 208, the intra-apparatus transmission path substrate 202, and the connector 209, is relayed by the repeater 206, and is transmitted to the semiconductor integrated circuit device 207 for the communication. In addition, the signal is transmitted from the semiconductor integrated circuit device 207 for the communication to the external apparatus via the connector 210. In contrast, a signal received by the semiconductor integrated circuit device 207 for the communication from the external apparatus via the connector 210 is transmitted to the repeater 206, is relayed by the repeater 206, passes through the connector 209, the intra-apparatus transmission path substrate 202, and the connector 208, is relayed by the repeater 205, and is transmitted to the semiconductor integrated circuit device 204 for the signal processing.

<Transmitter and Receiver in Electric Signal Transmission Apparatus>

Figure 3:
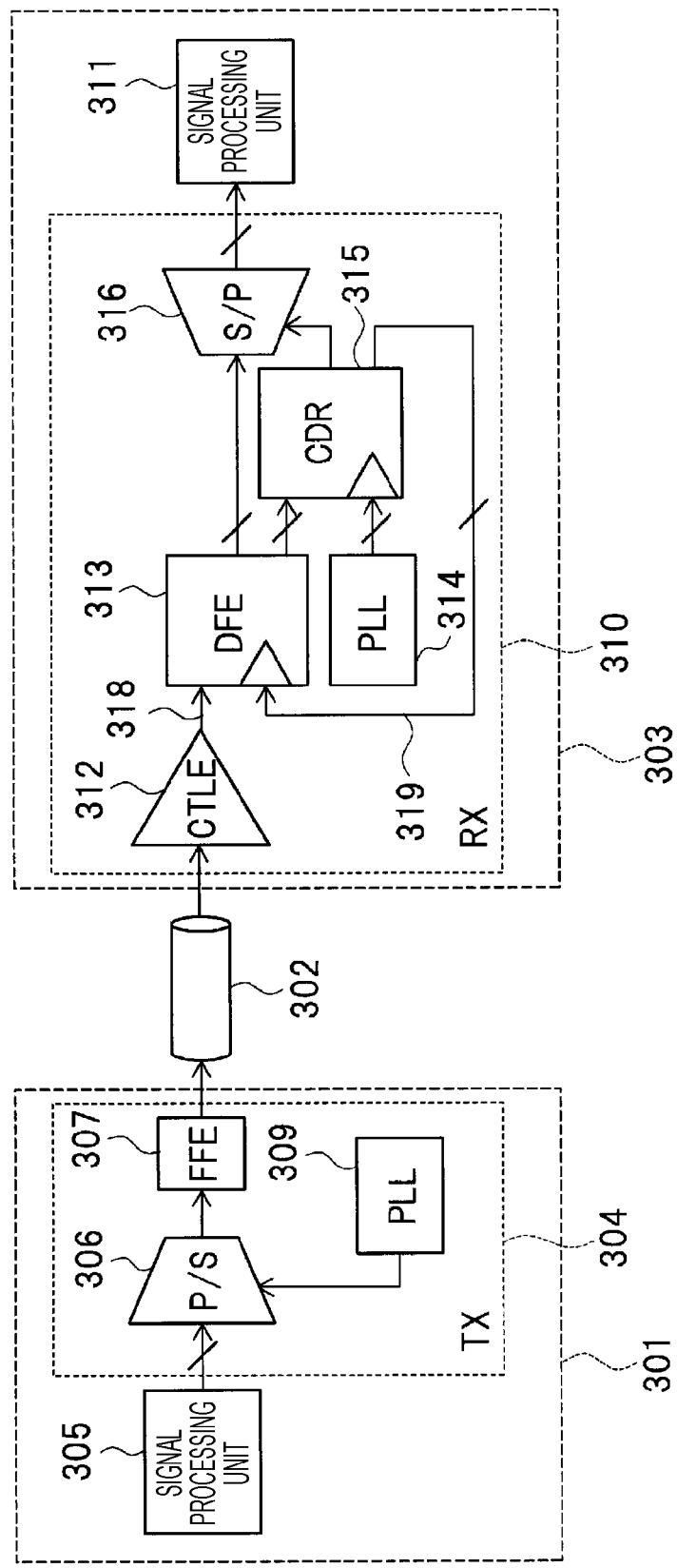
FIG. 3 is a diagram illustrating an example of configurations of a transmitter and a receiver in the electric signal transmission apparatus in FIGS. 1 and 2.

Next, a transmitter and a receiver in the electric signal transmission apparatus will be described using FIG. 3. FIG. 3 is a diagram illustrating an example of configurations of the transmitter and the receiver. FIG. 3 is an extraction diagram of only the transmitter and the receiver of the semiconductor integrated circuit device 102 for the signal processing and the semiconductor integrated circuit device 103 for the communication described in FIG. 1. Likewise, FIG. 3 is an extraction diagram of only the transmitter and the receiver of the semiconductor integrated circuit device 204 for the signal processing, the repeater 205, the repeater 206, and the semiconductor integrated circuit device 207 for the communication described in FIG. 2. Configurations of the transmitter and the receiver illustrated in FIG. 3 are the same in this embodiment to be described below.

An example of the case in which, in the transmitter and the receiver, a signal is transmitted from a semiconductor integrated circuit device 301 of a transmission side and the signal is received by a semiconductor integrated circuit device 303 of a reception side via a transmission path 302 is illustrated. The semiconductor integrated circuit device 301 of the transmission side has a transmitter (TX) 304 and a signal processing unit 305. The semiconductor integrated circuit device 303 of the reception side has a receiver (RX) 310 and a signal processing unit 311.

The transmitter 304 in the semiconductor integrated circuit device 301 includes a parallel-to-serial converter (P/S) 306, a feed forward equalizer (FFE) 307, and a phase locked loop (PLL) 309. The receiver 310 in the semiconductor integrated circuit device 303 includes a continuous time linear equalizer (CTLE) 312, a decision feedback equalizer (DFE) 313, a PLL 314, a clock and data recovery (CDR) 315, and a serial-to-parallel converter (S/P) 316.

In the transmitter 304, the parallel-to-serial converter 306 is a converter that converts a data signal input from the signal processing unit 305 from parallel transmission to serial transmission and outputs the data signal to the FFE 307. The FFE 307 is a feed forward equalizer that equalizes a waveform of the data signal input from the parallel-to-serial converter 306 to decrease gain of a low frequency side and outputs the data signal to the transmission path 302. The PLL 309 is a circuit that outputs a clock to synchronize a phase to the parallel-to-serial converter 306.

In the receiver 310, the CTLE 312 is a continuous time linear equalizer that amplifies the data signal transmitted from the transmission path 302 to increase gain of a high frequency side and outputs the data signal to the DFE 313. The DFE 313 is a decision feedback equalizer that executes filter processing on an inter-symbol interference component and a reflection component with respect to the data signal input from the CTLE 312, samples and holds the data signal with the clock input from the CDR 315, and outputs the data signal to the serial-to-parallel converter 316. The PLL 314 is a circuit that outputs a clock to synchronize a phase to the CDR 315. The CDR 315 is a clock/data reproduction circuit that detects an edge from the data signal input from the DFE 313, adjusts a phase of the clock input from the PLL 314, and outputs the clock to the DFE 313 and the serial-to-parallel converter 316. The serial-to-parallel converter 316 is a converter that converts the data signal input from the DFE 313 into a plurality of delayed data signals and outputs the data signals to the signal processing unit 311.

In the semiconductor integrated circuit device 303, 318 shows a CTLE output (data signal) from the CTLE 312 to the DFE 313 and 319 shows a DFE clock from the CDR 315 to the DFE 313.

Next, a flow of a signal in the transmitter 304 will be described. The transmitter 304 receives the data signal from the signal processing unit 305. The data signal is converted from the parallel transmission to the serial transmission in the parallel-to-serial converter 306 in synchronization with the clock from the PLL 309 and is transmitted. The data signal output from the parallel-to-serial converter 306 is output to the transmission path 302 after a waveform thereof is equalized in the FFE 307 to decrease the gain of the low frequency side. The data signal having passed through the transmission path 302 is transmitted to the receiver 310 in the semiconductor integrated circuit device 303.

Next, a flow of a signal in the receiver 310 will be described. The data signal transmitted from the transmission path 302 is amplified in the CTLE 312 to increase the gain of the high frequency side. The filter processing is executed on an inter-symbol interference component and a reflection component of the amplified data signal of the CTLE output 318 in the DFE 313 and the data signal is sampled and held with the DFE clock 319 of which the phase has been matched by the CDR 315. The CDR 315 detects an edge from the data signal on which the filter processing has been executed by the DFE 313 and adjusts the phase of the clock received from the PLL 314. The data signal sampled and held by the DFE 313 is transmitted to the serial-to-parallel converter 316, is converted into a plurality of delayed data signals, and is transmitted to the signal processing unit 311. The signal processing unit 311 transmits the received data signal to the transmitter, the data signal is transmitted from the transmitter to the transmission path, and the data signal is relayed.

<Decision Feedback Equalizer (DFE)>

Figure 4:
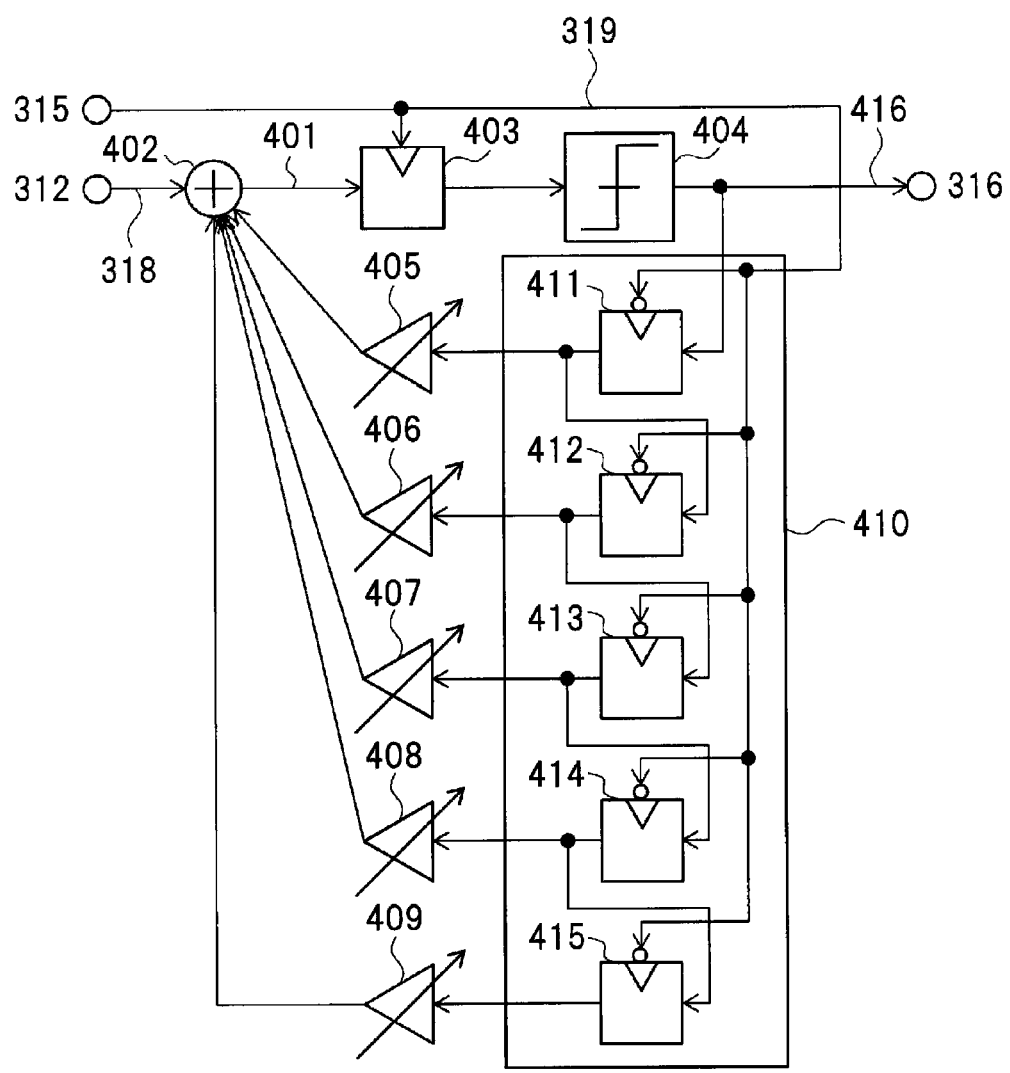
FIG. 4 is a diagram illustrating an example of a basic configuration of a decision feedback equalizer in the receiver in the electric signal transmission apparatus in FIG. 3.
Figure 5:
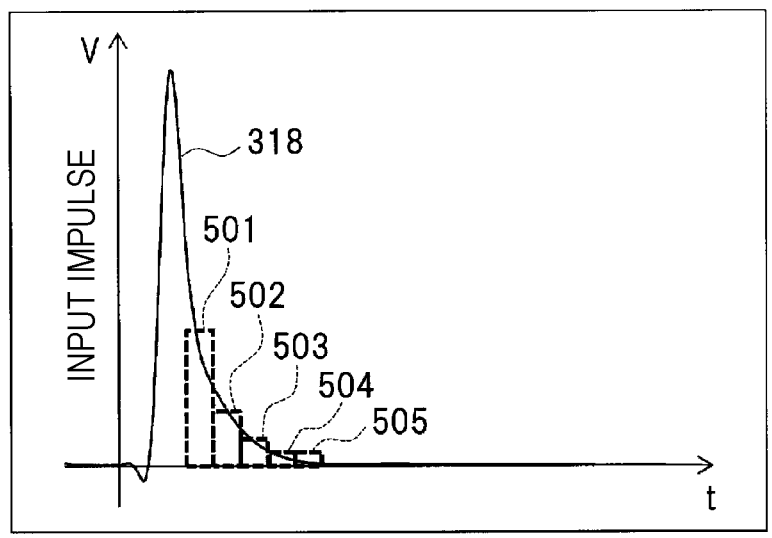
FIGS. 5(a) and 5(b) are diagrams illustrating an example of a relation of an input impulse and an output impulse in a decision feedback equalizer in the premise technology of the embodiment of the present invention.
Figure 5:
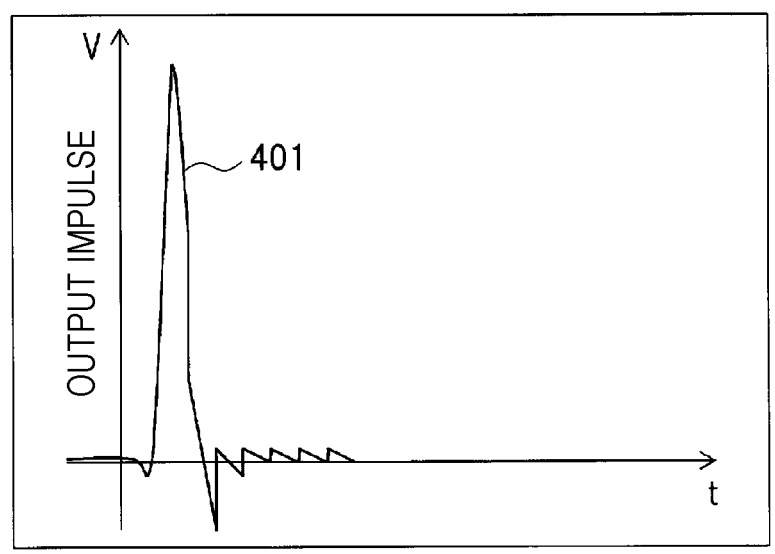

Next, the DFE 313 in the receiver 310 in the electric signal transmission apparatus will be described using FIGS. 4 to 7. FIG. 4 is a diagram illustrating an example of a basic configuration of the DFE 313. FIG. 4 illustrates an example of a DFE of five taps as the basic configuration of the DFE 313 in FIG. 3. The number of taps of the DFE is not limited to five and can increase or, decrease. Even though the number of taps increases or decreases, the number of taps added to the adder and the number of flip-flops in the shift register increase or decrease only and the configuration is the same.

The DFE 313 of the five taps includes an adder 402, a sample-and-hold circuit 403, a comparator 404, tap 1 to 5 variable amplifiers 405, 406, 407, 408, and 409, and a shift register 410. The shift register 410 includes flip-flops 411, 412, 413, 414, and 415. The DFE 313 receives a CTLE output (data signal) 318 from the CTLE 312 and a DFE clock 319 from the CDR 315 and outputs DFE output data (data signal) 416 to the serial-to-parallel converter 316.

The taps are added to the data signal 318 amplified by the CTLE 312 in the adder 402. The taps are values obtained by executing the tap coefficient multiplication of the DFE output data before 1 to 5 clocks by the tap 1 to 5 variable amplifiers 405 to 409. A DFE tap addition output (data signal) 401 to which the taps have been added by the adder 402 is sampled and held with the edge of the DFE clock 319 from the CDR 315, in the sample-and-hold circuit 403. In addition, the data signal sampled and held is determined as +1 in the case of 0 or more and is determined as −1 in the case of less than 0, in the comparator 404.

The data signal 416 determined by the comparator 404 is input to the shift register 410 and is delayed by each of the flip-flops 411 to 415 in synchronization with the DFE clock 319. The flip-flop 411 transmits a data signal before one clock to the tap 1 variable amplifier 405 executing the tap coefficient multiplication and multiplies data before one clock by the tap coefficient. Likewise, data before two clocks is input to the tap 2 variable amplifier 406, data before three clocks is input to the tap 3 variable amplifier 407, data before four clocks is input to the tap 4 variable amplifier 408, and data before five clocks is input to the tap 5 variable amplifier 409. In addition, each of the tap 1 to 5 variable amplifiers 405 to 409 executes the tap coefficient multiplication of the data by each variable amplifier and outputs the data. The gains of the tap 1 to 5 variable amplifiers 405 to 409 correspond to the tap coefficients and each of the gains is controlled by a control signal from the filter coefficient adjuster. In this way, the data signal 401 of the output with respect to the data signal 318 of the input of the DFE 313 is represented by the following formula (output/input) and the DFE 313 functions as a filter.

$$\text{output/input} = 1/(1 - \text{Tap1} \cdot Z^{-1} - \text{Tap2} \cdot Z^{-2} - \text{Tap3} \cdot Z^{-3} - \text{Tap4} \cdot Z^{-4} - \text{Tap5} \cdot Z^{-5})$$

An impulse response of the DFE 313 will be described using FIGS. 5(a) and 5(b) to facilitate understanding of an input/output characteristic of the DFE 313. FIGS. 5(a) and 5(b) are diagrams illustrating a relation of an input impulse and an output impulse in the DFE 313. In FIGS. 5(a) and 5(b), FIG. 5(a) illustrates the input impulse and FIG. 5(b) illustrates the output impulse. In addition, a horizontal axis shows a time (t) and a vertical axis shows a voltage (V).

A tap 1 (501), a tap 2 (502), a tap 3 (503), a tap 4 (504), and a tap 5 (505) having the clock width of the DFE input are added to the input (data signal 318) of the DFE of FIG. 5(a). As a result, a waveform where there remains a difference and inter-symbol interference is suppressed is generated like the output (data signal 401) of the DFE of FIG. 5(b).

Figure 6:
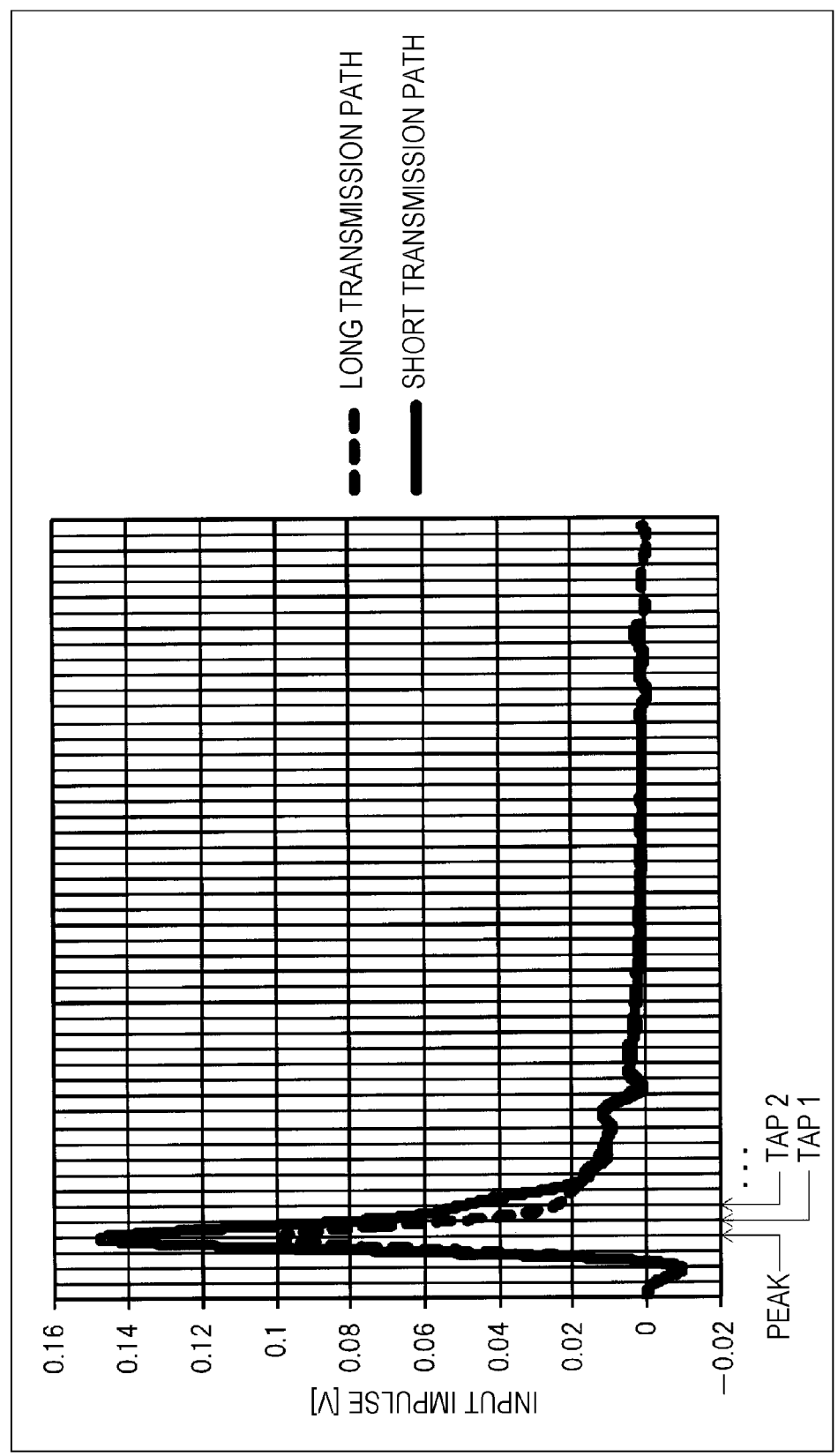
FIG. 6 is a diagram illustrating an example of an input impulse of a decision feedback equalizer in a different transmission path in the premise technology of the embodiment of the present invention.

The taps illustrated in FIG. 5(a) are different according to the input characteristic of the DFE and a tendency in a different transmission path will be described using FIG. 6. FIG. 6 is a diagram illustrating an example of the input impulse of the DFE in the different transmission path. In FIG. 6, a horizontal axis shows a time (t) and a vertical axis shows a voltage (V). In addition, a broken line shows a long transmission path and a solid line shows a short transmission path.

As illustrated in FIG. 6, if an input peak value is large, the taps tend to increase. In FIG. 6, one scale of the horizontal axis becomes a width of one clock of the DFE and heights when shifted by one clock from a peak correspond to the tap 1, the tap 2, . . . . For example, the tap 1 decreases in the broken line (long transmission path) where the input of the DFE is small as compared with the solid line (short transmission path) where the input of the DFE is large. In the short transmission path, the height of the tap 1 when shifted by one clock from the peak (about 0.15 V) is about 0.1 V. Meanwhile, in the long transmission path, the height of the tap 1 when shifted by one clock from the peak (about 0.1 V) is about 0.06 V.

In addition, the input of the DFE is a superposition of impulses as illustrated in FIG. 6. For this reason, if the input peak value of the DFE is large and the magnitude of the inter-symbol interference from the previous signal is the same, a deterioration amount of jitter decreases with respect to the small input peak value of the DFE. This means that an influence on the jitter due to a noise component left when the taps are added by the DFE decreases when the input peak value of the DFE is large and an allowed amount of the noise is determined by the input peak value of the DFE.

Figure 7:
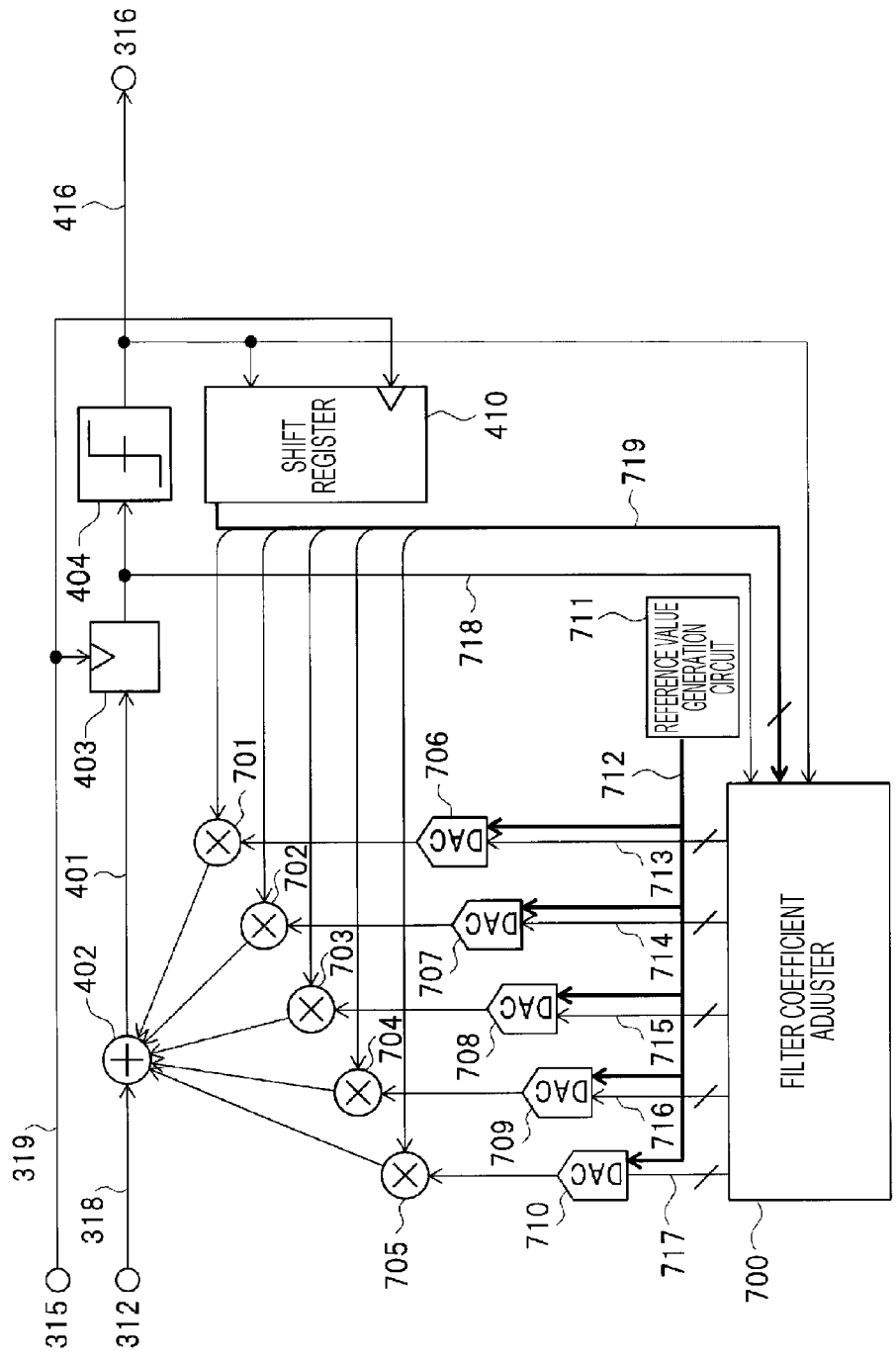
FIG. 7 is a diagram illustrating an example of a configuration of a decision feedback equalizer in the receiver in the electric signal transmission apparatus in FIG. 3.

Here, the actual DFE 313 will be described using FIG. 7. FIG. 7 is a diagram illustrating an example of a configuration of the DFE 313.

The DFE 313 includes an adder 402, a sample-and-hold circuit 403, a comparator 404, a shift register 410, a filter coefficient adjuster 700, multipliers 701, 702, 703, 704, and 705, digital-to-analog converters (DACs) 706, 707, 708, 709, and 710, and a reference value generation circuit 711. As illustrated in FIG. 7, the tap 1 to 5 variable amplifiers 405 to 409 illustrated in FIG. 4 are replaced with the multipliers 701 to 705 and the DACs 706 to 710.

In the DFE 313, 712 shows a reference value output from the reference value generation circuit 711 to each of the DACs 706 to 710 and 713 to 717 show tap 1 to 5 coefficient codes output from the filter coefficient adjuster 700 to the individual DACs 706 to 710, respectively. In addition, 718 shows a DFE sample-and-hold output output from the sample-and-hold circuit 403 to the filter coefficient adjuster 700 and the comparator 404 and 719 shows a delayed data string output from the shift register 410 to the filter coefficient adjuster 700 and the individual multipliers 701 to 705.

The DACs 706 to 710 receive a reference value 712 of a reference current or a reference voltage from the reference value generation circuit 711 and convert input data into an analog voltage or current with resolutions proportional to the reference value 712. In addition, because an appropriate value of a filter coefficient (tap coefficient) of the DFE is changed by an environmental change such as a temperature and a power supply voltage, the filter coefficient adjuster 700 maintaining the tap coefficient appropriately is added. The DACs 706 to 710 receive the tap 1 to 5 coefficient codes 713 to 717 to be tap coefficient data from the filter coefficient adjuster 700 and output a voltage or a current according to each data. Outputs of the DACs 706 to 710 are input to the multipliers 701 to 705, respectively, and are multiplied by the data before one clock, the data before the two clocks, the data before the three clocks, the data before the four clocks, and the data before the five clocks, respectively. In addition, the multiplied data is added to the input data of the CTLE output 318 in the adder 402. When the data input from the shift register 410 to the multipliers 701 to 705 is one bit, the multipliers may be realized using multiplexers.

The filter coefficient adjuster 700 receives the DFE sample-and-hold output 718, the DFE output data 416, and the delayed data string 719 and outputs the tap 1 to 5 coefficient codes 713 to 717 to the DACs 706 to 710, respectively. The filter coefficient adjuster 700 takes a correlation of the DFE sample-and-hold output 718, the peak value acquired from the DFE output data 416, and the delayed data string 719, executes averaging, and outputs the tap coefficients of the individual taps. In addition, the filter coefficient adjuster 700 becomes a part of a feedback loop for receiving the DFE sample-and-hold output 718, the DFE output data 416, and the delayed data string 719 to be a tap application result. For this reason, the tap coefficient is converged to an appropriate value by the feedback loop including the filter coefficient adjuster 700.

As illustrated in FIG. 6, the input of the DFE 313 is various in accordance with the transmission path and the magnitude of the tap or the allowed noise amount is various. This affects output ranges and resolutions of the DACs 706 to 710 in FIG. 7. For example, when the input peak value of the DFE 313 is large, the tap coefficients increase and the output ranges of the DACs 706 to 710 are widened. In contrast, when the input peak value of the DFE 313 is small, it is necessary to decrease the resolutions, because quantization noise should be suppressed. For this reason, to realize the above, the DACs 706 to 710 in which the resolutions are small, the output ranges are wide, and the number of bits is large are needed. This means that areas and consumption powers of the DACs 706 to 710 increase. If the number of taps increases as a transmission speed increases, this influence becomes more serious.

Here, the present inventors focus attention on the following points. When the input peak value of the DFE 313 is large, the tap coefficients increase. However, because the noise allowed value also increases, the quantization noise may be increased and the resolutions of the DACs 706 to 710 may be set coarsely. In contrast, when the input peak value of the DFE 313 is small, the allowed value of the noise decreases at the same time as when the tap coefficients decrease. For this reason, the resolutions of the DACs 706 to 710 need to be set finely to suppress the quantization noise. Attention is focused on a relation of the input peak value of the DFE 313 and the resolutions of the DACs 706 to 710 and a point where, when the transmission path is determined once in the wired transmission, the transmission path is fixed.

The waveform of the input peak value of the DFE 313 is equalized by changing setting of the FFE 307 or the CTLE 312 by the transmission path, so that the change in the input peak value is suppressed small as compared with the change in the peak value generated by a single object of the transmission path. However, there is the following problem. Because flexibility of the setting of the FFE 307 or the CTLE 312 is low, the input peak value of the DFE 313 may be changed by the transmission path. However, in the wired transmission, because the transmission path is fixed, the input peak value of the DFE 313 does not change every time. For this reason, the input peak value of the DFE 313 is detected and the resolutions of the DACs 706 to 710 can be switched according to the input peak value.

Therefore, if the detected input peak value of the DFE 313 is large, control is executed such that the output ranges of the DACs 706 to 710 are widened by causing the resolutions of the DACs 706 to 710 to become coarse. In contrast, if the detected input peak value of the DFE 313 is small, control is executed such that the output ranges of the DACs 706 to 710 are narrowed by causing the resolutions of the DACs 706 to 710 to become fine. As a result, a difference of the transmission path can be controlled flexibly without increasing the number of bits of the DACs 706 to 710. That is, in the transmission path in which the input peak value of the DFE 313 is large, it is possible to correspond to the large tap coefficients by widening the output ranges of the DACs 706 to 710. In contrast, in the transmission path in which the input peak value of the DFE 313 is small, it is possible to correspond to a request for the low quantization noise by decreasing the resolutions of the DACs 706 to 710. As a result, an increase in the area or the consumption power can be suppressed while the transmission path is controlled flexibly.

The DFE 313 according to this embodiment to realize an idea devised by the present inventors will be described below.

First Embodiment

An electric signal transmission apparatus according to a first embodiment will be described using FIGS. 8 to 17. The electric signal transmission apparatus according to the first embodiment is different from the electric signal transmission apparatus according to the premise technology of this embodiment in a configuration and an operation of a decision feedback equalizer (DFE). In the first embodiment, because the electric signal transmission apparatus is the same as the electric signal transmission apparatus illustrated in FIGS. 1 and 2 and a transmitter and a receiver are the same as the transmitter and the receiver illustrated in FIG. 3, explanation thereof is omitted herein. Hereinafter, a difference with the DFE according to the premise technology illustrated in FIG. 7 will be mainly described.

Decision Feedback Equalizer (DFE) According to First Embodiment

Figure 8:
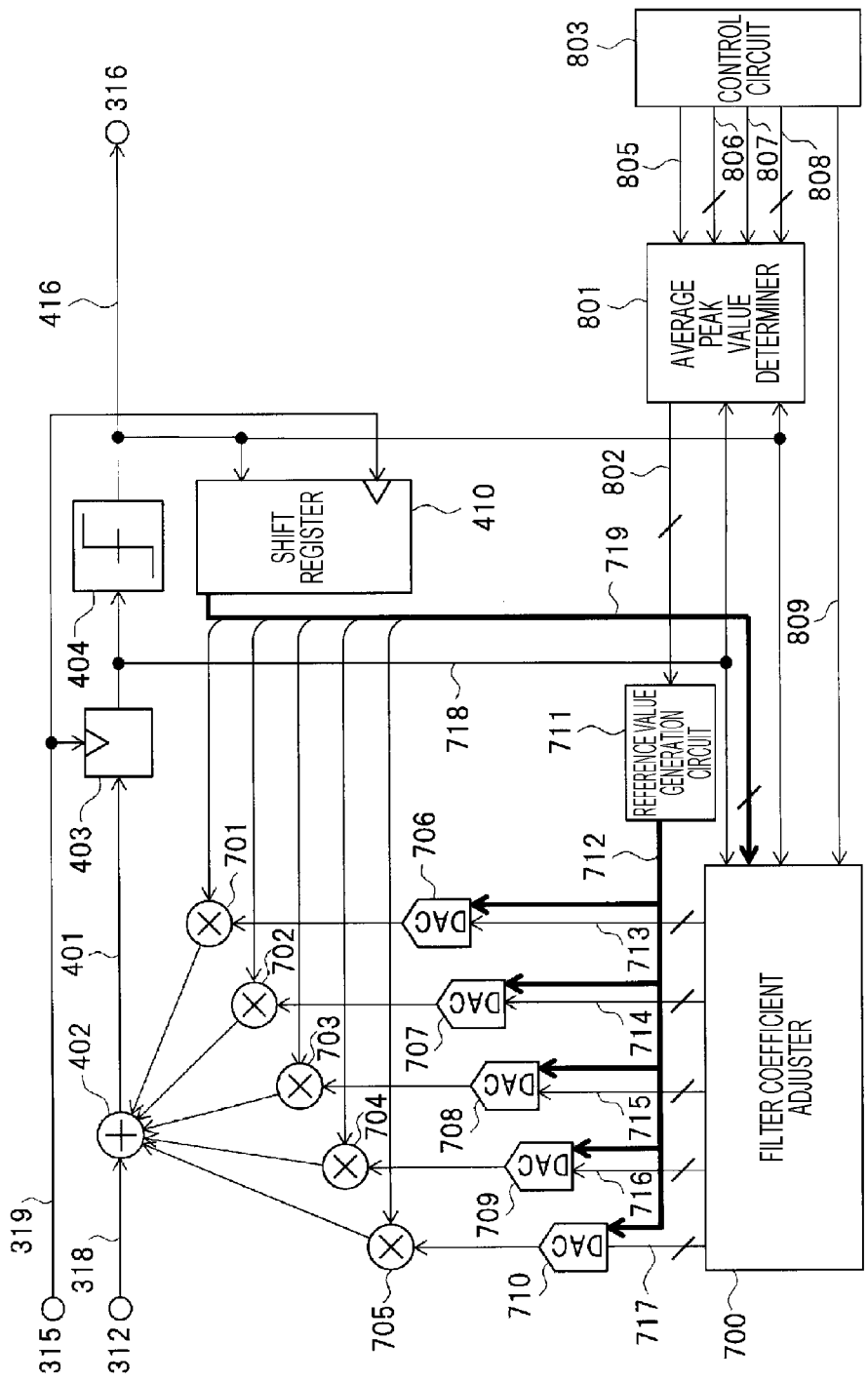
FIG. 8 is a diagram illustrating an example of a configuration of a decision feedback equalizer in a receiver in an electric signal transmission apparatus according to a first embodiment of the present invention.

First, a DFE 313 according to the first embodiment with respect to the DFE according to the premise technology will be described using FIG. 8. FIG. 8 is a diagram illustrating an example of a configuration of the DFE 313 according to the first embodiment.

The DFE 313 according to the first embodiment is obtained by adding an average peak value determiner 801 detecting an average peak value of the DFE sample-and-hold output 718 of the result obtained by sampling and holding the DFE tap addition output 401 and a control circuit 803 thereof to the configuration of FIG. 7 according to the premise technology. The average peak value determiner 801 has a function of controlling the reference value generation circuit 711 generating the reference value 712 determining the resolutions of the DACs 706 to 710, on the basis of the detected average peak value, and switching the resolutions of the DACs 706 to 710. That is, the DFE 313 according to the first embodiment includes the adder 402, the sample-and-hold circuit 403, the comparator 404, the shift register 410, the filter coefficient adjuster 700, the multipliers 701 to 705, the DACs 706 to 710, the reference value generation circuit 711, the average peak value determiner 801, and the control circuit 803.

The adder 402 is an adder that adds taps of filters to the CTLE output 318. The sample-and-hold circuit 403 is a circuit that samples and holds the DFE tap addition output 401 from the adder 402. The comparator 404 is a comparator that determines the positive/negative of the DFE sample-and-hold output 718 from the sample-and-hold circuit 403 and outputs a determination result. The shift register 410 is a shift register that delays the DFE output data 416 from the comparator 404 by the integral multiple of a cycle of the DFE clock 319. The filter coefficient adjuster 700 is an adjuster that receives the DFE sample-and-hold output 718, the DFE output data 416, and the delayed data string 719 from the shift register 410, outputs the tap coefficients of the filters to the DACs 706 to 710, and adjusts the tap coefficients of the filters by the feedback loop. The multipliers 701 to 705 are multipliers that output the taps of the filters obtained by multiplying outputs of the DACs 706 to 710 and the delayed data string 719 from the shift register 410 to the adder 402. The DACs 706 to 710 are converters that execute digital-to-analog conversion on the tap coefficients of the filters. The reference value generation circuit 711 is a reference circuit that switches the reference value 712 of the output according to a DAC resolution switch signal 802 to be an input control signal.

The average peak value determiner 801 receives the DFE sample-and-hold output 718 and the DFE output data 416, detects an average peak value of the DFE tap addition output 401, and compares the detected average peak value with a threshold value set by a program. If the average peak value is larger than the threshold value, the average peak value determiner 801 increases a code of the DAC resolution switch signal 802, increases the reference value 712 output from the reference value generation circuit 711 from an initial value set by the program, and causes the resolutions of the DACs 706 to 710 to become coarse from the initial value. In contrast, if the average peak value is smaller than the threshold value, the average peak value determiner 801 decreases the code of the DAC resolution switch signal 802, decreases the reference value 712 output from the reference value generation circuit 711 from the initial value set by the program, and causes the resolutions of the DACs 706 to 710 to become fine from the initial value.

The control circuit 803 is a controller that controls the average peak value determiner 801 and the filter coefficient adjuster 700. For the control, an average peak value detection control signal 805, a DAC resolution switch threshold value signal 806, a determination trigger signal 807, and a DAC resolution switch signal initial value 808 are input from the control circuit 803 to the average peak value determiner 801. In addition, a filter coefficient adjuster control signal 809 is input from the control circuit 803 to the filter coefficient adjuster 700.

The average peak value detection control signal 805 is a signal to control a start and an end of detection of an average peak value. The DAC resolution switch threshold value signal 806 is a signal that becomes a threshold value when the resolutions of the DACs 706 to 710 are switched. The determination trigger signal 807 is a signal that becomes a trigger when the average peak value and the DAC resolution switch threshold value signal 806 compare with each other. The DAC resolution switch signal initial value 808 is a signal that becomes an initial value when the resolutions of the DACs 706 to 710 are switched. The filter coefficient adjuster control signal 809 is a signal to control a stop and a start of the update of the tap coefficients. For example, the control circuit 803 stops the update of the tap coefficients until the average peak value is detected and the resolutions of the DACs 706 to 710 are switched, according to the filter coefficient adjuster control signal 809.

<Average Peak Value Determiner>

Figure 9:
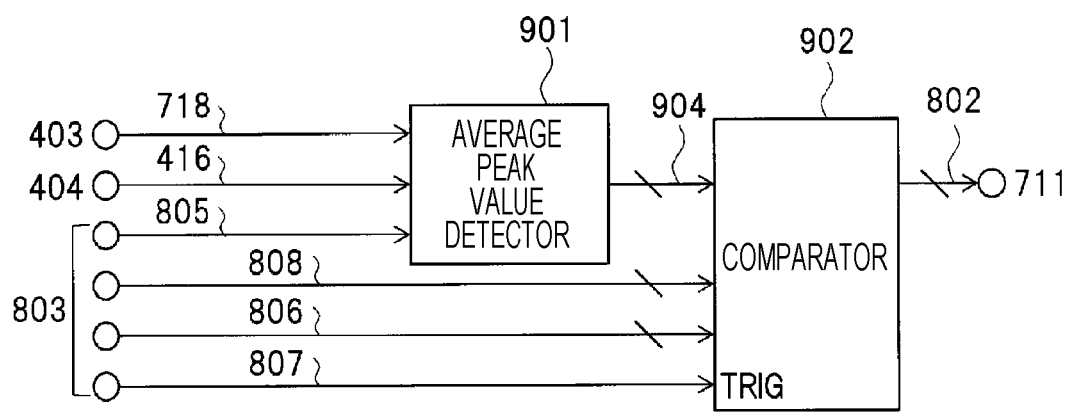
FIG. 9 is a diagram illustrating an example of a configuration of an average peak value determiner in the decision feedback equalizer in FIG. 8.

Next, the average peak value determiner 801 in the DFE 313 will be described using FIG. 9. FIG. 9 is a diagram illustrating an example of a configuration of the average peak value determiner 801.

The average peak value determiner 801 includes an average peak value detector 901 and a comparator 902. The average peak value detector 901 receives the DFE sample-and-hold output 718 and the DFE output data 416, controls an operation by the average peak value detection control signal 805 from the control circuit 803, and outputs an average peak value 904. The comparator 902 controls an operation by the determination trigger signal 807 from the control circuit 803, compares the average peak value 904 and the DAC resolution switch threshold value signal 806 from the control circuit 803, and outputs the DAC resolution switch signal 802 to be a determination result to the reference value generation circuit 711. After the comparison, the DAC resolution switch signal 802 executes switching to cause a value to become coarse from the DAC resolution switch signal initial value 808 or cause the value to become fine.

<Reference Value Generation Circuit>

Figure 10:
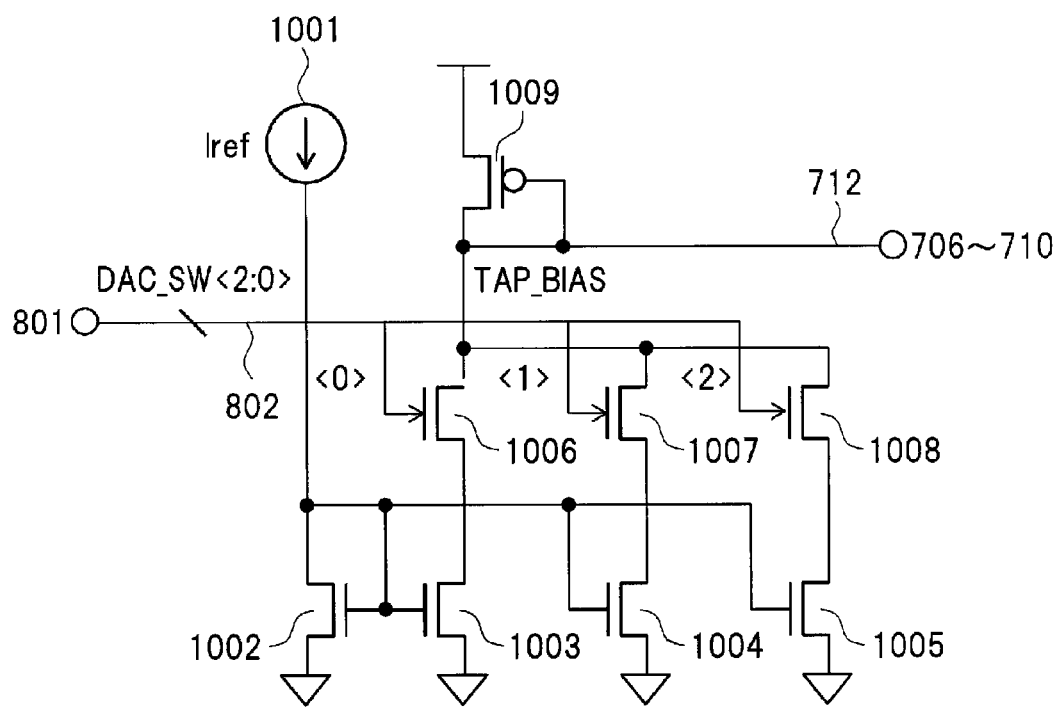
FIG. 10 is a diagram illustrating an example of a configuration of a reference value generation circuit in the decision feedback equalizer in FIG. 8.

Next, the reference value generation circuit 711 in the DFE 313 will be described using FIG. 10. FIG. 10 is a diagram illustrating an example of a configuration of the reference value generation circuit 711. FIG. 10 illustrates a reference voltage switch circuit for DAC resolution switching as an example of the reference value generation circuit 711 and illustrates an example of three bits.

The reference value generation circuit 711 includes a reference current source 1001, a current source circuit 1002, current mirror circuits 1003, 1004, and 1005, switches 1006, 1007, and 1008, and a current source circuit 1009. The reference current source 1001 is composed of a band gap circuit. The reference value generation circuit 711 flows a reference current (Iref) capable of being generated by the reference current source 1001 to the diode-connected current source circuit 1002 and has a configuration of a current mirror in which a gate of the current source circuit 1002 and gates of the individual current mirror circuits 1003 to 1005 are connected.

A mirror ratio of the current mirror circuits 1003, 1004, and 1005 becomes 1:2:4 and the individual current mirror circuits are controlled by the individual switches 1006 to 1008 to flow a current to the current source circuit 1009 or not to flow the current to the current source circuit 1009. A control signal (DAC_SW<2:0>) of each of the switches 1006 to 1008 is the DAC resolution switch signal 802 and a least significant bit <0> is connected to the switch 1006, a second bit <1> is connected to the switch 1007, and a third bit <2> is connected to the switch 1008. In addition, when the connected bit is High, a current flows from each current mirror circuit to the current source circuit 1009 and when the connected bit is Low, the current does not flow from each current mirror circuit to the current source circuit 1009. For this reason, the current flowing to the current source circuit 1009 is changed by a value of the DAC resolution switch signal 802, the reference value 712 (voltage: TAP BIAS) distributed to the individual DACs 706 to 710 is changed, and the resolution of each DAC is switched.

<Operation of Average Peak Value Detection>

Figure 11:
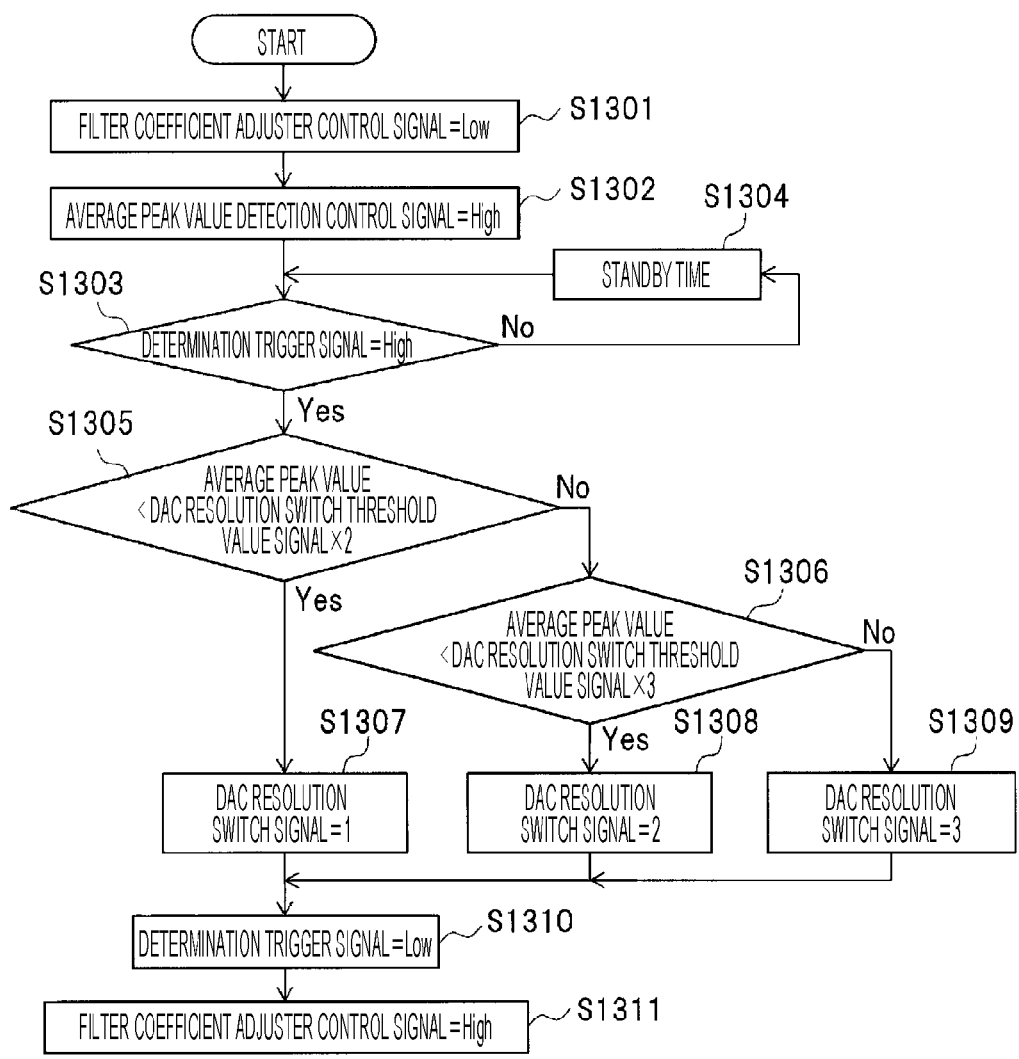
FIG. 11 is a diagram illustrating an example of an operation sequence of average peak value detection in the decision feedback equalizer in FIG. 8.

Next, an operation of the average peak value detection in the DFE 313 will be described using FIG. 11. FIG. 11 is a diagram illustrating an example of an operation sequence of the average peak value detection.

First, the control circuit 803 sets the filter coefficient adjuster control signal 809 to Low and stops the update of the tap coefficients. Then, the control circuit 803 sets the average peak value detection control signal 805 to High and starts the average peak value detection in the average peak value detector 901 (S1301 and S1302). Then, after a standby time, if the control circuit 803 switches the determination trigger signal 807 from Low to High, the comparator 902 compares the average peak value 904 and the DAC resolution switch threshold value signal 806 (S1303 and S1304).

As a comparison result, if the average peak value 904 is smaller than twice the DAC resolution switch threshold value signal 806 (S1305—Yes), the DAC resolution switch signal 802 is set to 1 (S1307). If the average peak value 904 is larger than twice the DAC resolution switch threshold value signal 806 and smaller than triple the DAC resolution switch threshold value signal 806 (S1305—No and S1306—Yes), the DAC resolution switch signal 802 is set to 2 (S1308). If the average peak value 904 is larger than triple the DAC resolution switch threshold value signal 806 (S1306—No), the DAC resolution switch signal 802 is set to 3 (S1309).

Then, the control circuit 803 sets the determination trigger signal to Low, sets the filter coefficient adjuster control signal 809 to High, and starts the update of the tap coefficients to be stopped (S1310 and S1311).

Here, the case in which the DAC resolution switch signal 802 is set to 1, 2, or 3 has been described. However, even in the case in which the DAC resolution switch signal 802 is set to 1 or 2 or the case in which the DAC resolution switch signal 802 is set to 4 or more, the same application is enabled by changing a branch number according to a determination condition.

<First Example of Average Peak Value Detector>

Figure 12:
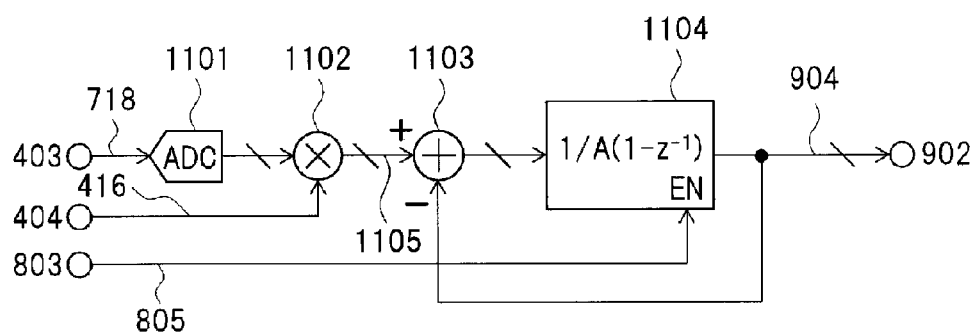
FIG. 12 is a diagram illustrating a first example of a configuration of an average peak value detector in the average peak value determiner in FIG. 9.

Next, the average peak value detector 901 in the average peak value determiner 801 will be described using FIG. 12. FIG. 12 is a diagram illustrating the first example of the configuration of the average peak value detector 901.

The average peak value detector 901 illustrated in FIG. 12 includes an analog-to-digital converter (ADC) 1101, a multiplier 1102, a subtracter 1103, and an integrator 1104. The ADC 1101 is a converter that executes analog-to-digital conversion on the DFE sample-and-hold output 718 of a result obtained by sampling and holding an output of the adder 402. The multiplier 1102 is a multiplier that multiplies an output of the ADC 1101 and the DFE output data 416 to be the output of the comparator 404. The subtracter 1103 is a subtracter that subtracts an output of the integrator 1104 from a DFE peak value 1105 to be an output of the multiplier 1102. The integrator 1104 is an integrator that has a function of varying gain and integrates an output of the subtracter 1103. The output of the integrator 1104 is input to the subtracter 1103 and is subtracted from the output of the multiplier 1102, so that the average peak value 904 is detected.

In the average peak value detector 901, the DFE sample-and-hold output 718 is converted into a digital signal by the ADC 1101, is multiplied by the DFE output data 416 in the multiplier 1102, is converted into an absolute value, and becomes the DFE peak value 1105. The subtracter 1103 and the integrator 1104 connected to an output side of the multiplier 1102 form a feedback loop. The feedback loop operates such that the DFE peak value 1105 to an input to the subtracter 1103 and the average peak value 904 to be an output from the integrator 1104 are matched and the integrator 1104 performs averaging of the input. Therefore, the average peak value of the DFE can be detected. The feedback loop operates during a period where the average peak value detection control signal 805 input to an enable terminal (EN) of the integrator 1104 is High.

<Second Example of Average Peak Value Detector>

Figure 13:
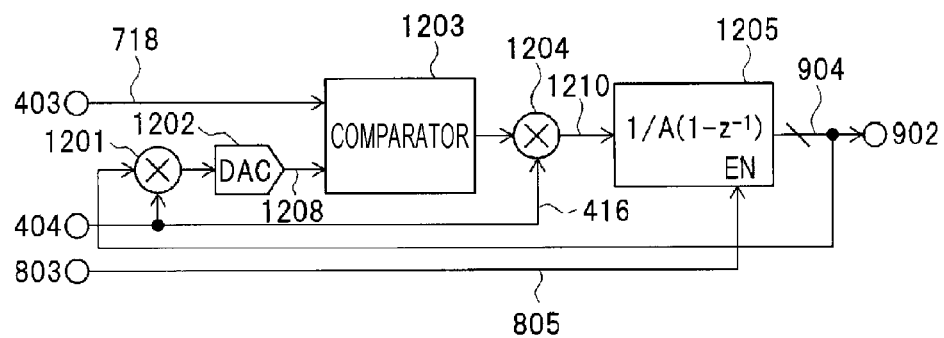
FIG. 13 is a diagram illustrating a second example of the configuration of the average peak value detector in the average peak value determiner in FIG. 9.

Next, a second example of the average peak value detector 901 will be described as a change example of the configuration of the average peak value detector 901, using FIG. 13. FIG. 13 is a diagram illustrating the second example of the configuration of the average peak value detector 901. The example of FIG. 13 becomes a configuration of the case in which a high-speed ADC cannot be used.

The average peak value detector 901 illustrated in FIG. 13 includes a multiplier 1201, a DAC 1202, a comparator 1203, a multiplier 1204, and an integrator 1205. The multiplier 1201 is a multiplier that multiplies an output of the integrator 1205 and the DFE output data 416 to be the output of the comparator 404. The DAC 1202 is a converter that executes digital-to-analog conversion on an output of the multiplier 1201. The comparator 1203 is a comparator that compares the magnitudes of an average output voltage 1208 to be an output of the DAC 1202 and the DFE sample-and-hold output 718 of the result obtained by sampling and holding the output of the adder 402. The multiplier 1204 is a multiplier that multiplies the output of the comparator 1203 and the DFE output data 416. The integrator 1205 is an integrator that has a function of varying gain and integrates a peak value comparison result 1210 to be an output of the multiplier 1204. An output of the integrator 1205 is input to the multiplier 1201, so that the average peak value 904 is detected.

In the average peak value detector 901, the output of the integrator 1205 is input to the multiplier 1201 and the multiplier 1201, the DAC 1202, the comparator 1203, the multiplier 1204, and the integrator 1205 form a feedback loop. Similarly to FIG. 12, the feedback loop operates such that a value obtained by converting the average peak value 904 into an analog value by the DAC 1202 and an average value of the DFE sample-and-hold output 718 are matched and the average peak value of the DFE 313 can be detected.

Figure 14:
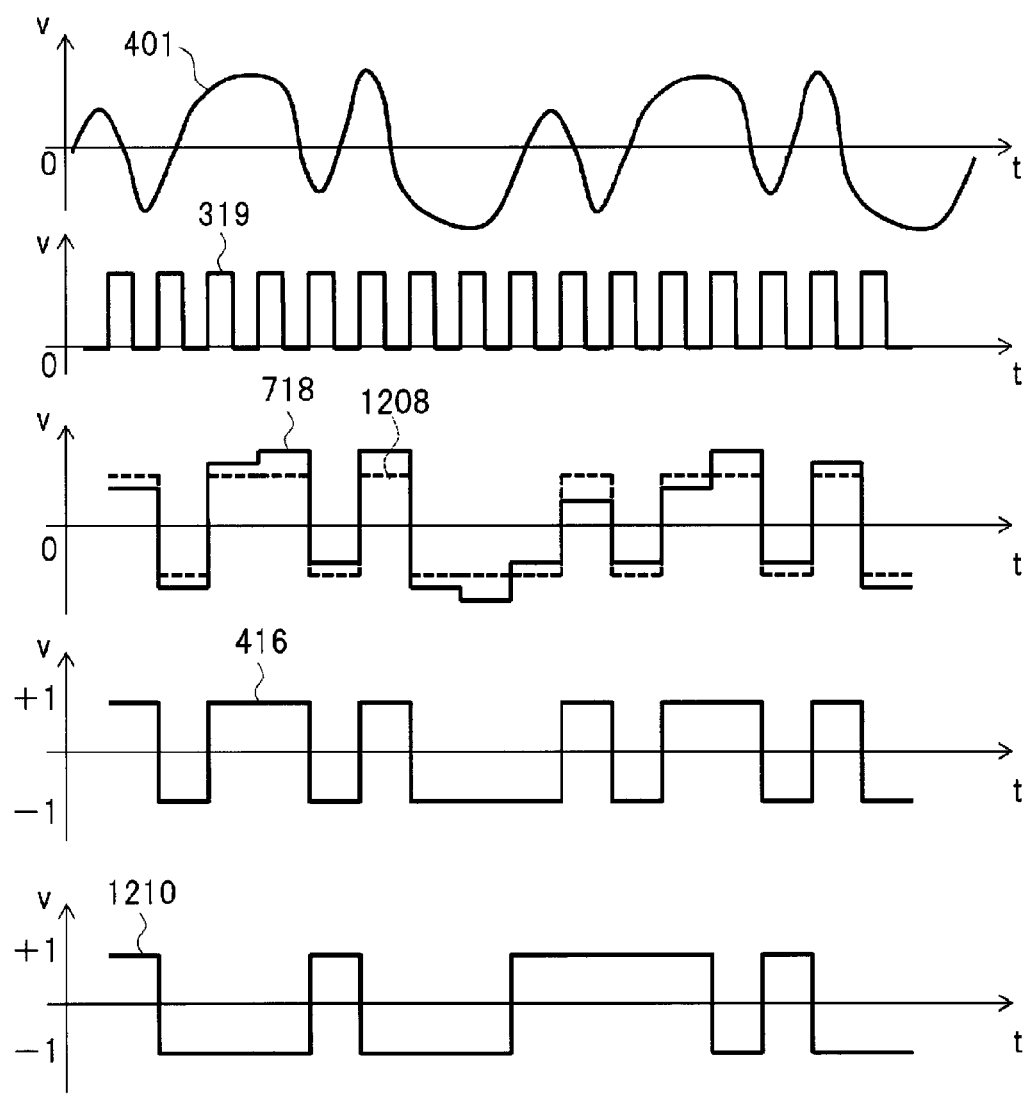
FIG. 14 is a diagram illustrating an example of an operation of a comparator in the average peak value detector in FIG. 13.

Next, an operation of the comparator 1203 in the average peak value detector 901 will be described using FIG. 14. FIG. 14 is a diagram illustrating an example of the operation of the comparator 1203. In FIG. 14, a waveform of each of the DFE tap addition output 401, the DFE clock 319, the DFE sample-and-hold output 718, the DFE output data 416, and the peak value comparison result 1210 of the multiplier 1204 is illustrated.

As illustrated in FIG. 14, a polarity according to the DFE output data 416 is added to the average peak value 904 by the multiplier 1201. When the DFE output data 416 is High, a positive voltage with respect to a center voltage is output as the average output voltage 1208 from the DAC 1202. In contrast, when the DFE output data 416 is Low, a negative voltage with respect to the center voltage is output as the average output voltage 1208 from the DAC 1202. The comparator 1203 compares the DFE sample-and-hold output 718 and the average output voltage 1208 from the DAC 1202. When the DFE sample-and-hold output 718 is large, the comparator 1203 outputs −1 and when the DFE sample-and-hold output 718 is small, the comparator 1203 outputs +1.

If the DFE sample-and-hold output 718 exists between a maximum value and a minimum value of the average output voltage 1208 by multiplying the output of the comparator 1203 and the DFE output data 416 by the multiplier 1204, the peak value comparison result 1210 becomes +1. If the DFE sample-and-hold output 718 does not exist between the maximum value and the minimum value of the average output voltage 1208, the peak value comparison result 1210 becomes −1.

In the integrator 1205, the peak value comparison result 1210 is integrated during a period where the average peak value detection control signal 805 is High and an output thereof is fed back to the multiplier 1201. The integrator 1205 operates such that an average of an absolute value of the DFE sample-and-hold output 718 is matched with an absolute value of the average output voltage 1208 obtained by converting the average peak value 904 into an analog value, to perform averaging.

<Third Example of Average Peak Value Detector>

Figure 15:
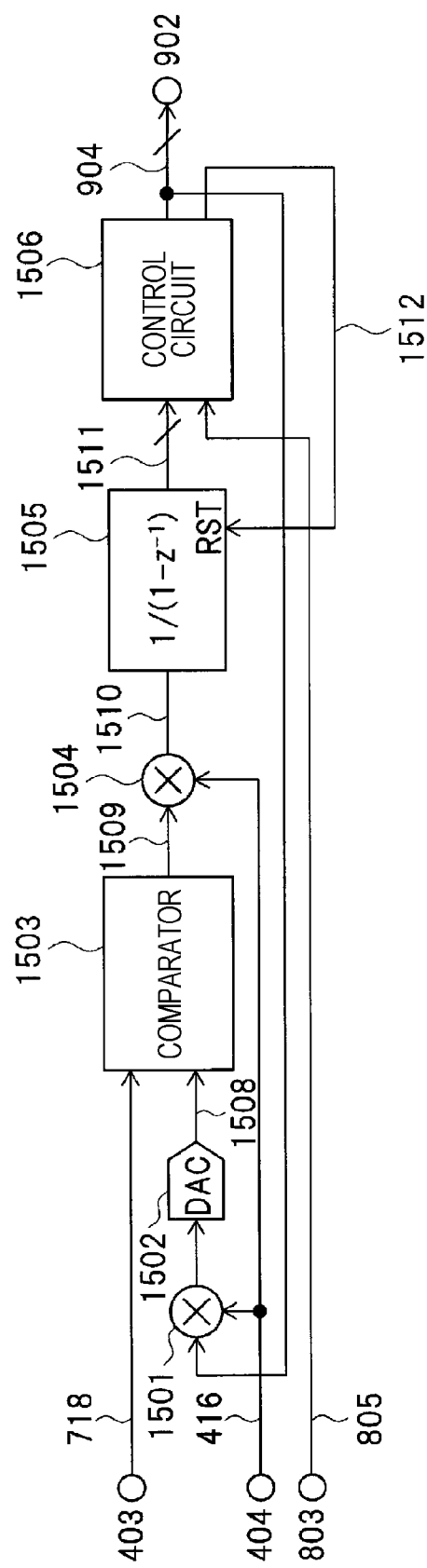
FIG. 15 is a diagram illustrating a third example of the configuration of the average peak value detector in the average peak value determiner in FIG. 9.

Next, a third example of the average peak value detector 901 will be described as a change example of the configuration of the average peak value detector 901, using FIG. 15. FIG. 15 is a diagram illustrating the third example of the configuration of the average peak value detector 901. The example of FIG. 15 becomes a configuration in which an average peak value is detected using a binary search.

The average peak value detector 901 illustrated in FIG. 15 includes a multiplier 1501, a DAC 1502, a comparator 1503, a multiplier 1504, an integrator 1505 with a reset, and a control circuit 1506. The multiplier 1501 is a multiplier that multiplies an output of the control circuit 1506 and the DFE output data 416 to be the output of the comparator 404. The DAC 1502 is a converter that executes digital-to-analog conversion on an output of the multiplier 1501. The comparator 1503 is a comparator that compares the magnitudes of a DAC output 1508 from the DAC 1502 and the DFE sample-and-hold output 718 of the result obtained by sampling and holding the output of the adder 402. The multiplier 1504 is a multiplier that multiplies a comparator output 1509 from the comparator 1503 and the DFE output data 416. The integrator 1505 with the reset is an integrator that has a function of varying gain and integrates a multiplier output 1510 from the multiplier 1504. The control circuit 1506 is a controller that executes control, on the basis of an output of the integrator 1505. An output of the control circuit 1506 is input to the multiplier 1501, a feedback loop is formed, and the binary search is performed, so that the average peak value 904 is detected.

If the average peak value detection control signal 805 becomes High, the control circuit 1506 starts an operation, sets each bit of the average peak value 904 to High sequentially from a most significant bit, and compares the magnitudes of the average peak value 904 and an average value of the DFE sample-and-hold output 718 (positive/negative determination). By the comparison, a value of each bit is fixed sequentially from the most significant bit and the average peak value 904 is detected. The average peak value 904 is multiplied by the DFE output data 416 in the multiplier 1501 and is converted into an analog voltage in the DAC 1502.

The magnitudes of the DAC output 1508 from the DAC 1502 and the DFE sample-and-hold output 718 are compared in the comparator 1503. When the DFE sample-and-hold output 718 is larger than the DAC output 1508, +1 is output and when the DFE sample-and-hold output 718 is smaller than the DAC output 1508, −1 is output. The comparator output 1509 from the comparator 1503 is multiplied by the DFE output data 416 in the multiplier 1504. When an absolute value of the DFE sample-and-hold output 718 is larger than the DAC output 1508, the multiplier output 1510 becomes +1. When the absolute value of the DFE sample-and-hold output 718 is smaller than the DAC output 1508, the multiplier output 1510 becomes −1.

The multiplier output 1510 from the multiplier 1504 is integrated by the integrator 1505 with the reset during a period where a reset signal 1512 from the control circuit 1506 input to a reset terminal (RST) of the integrator 1505 is Low. An integrator output 1511 from the integrator 1505 is input to the control circuit 1506 and the positive/negative of the integrator output 1511 is determined after a constant time. When the integrator output 1511 is positive, a bit of the average peak value 904 is fixed to High and when the integrator output 1511 is negative, the bit of the average peak value 904 is fixed to Low.

Figure 16:
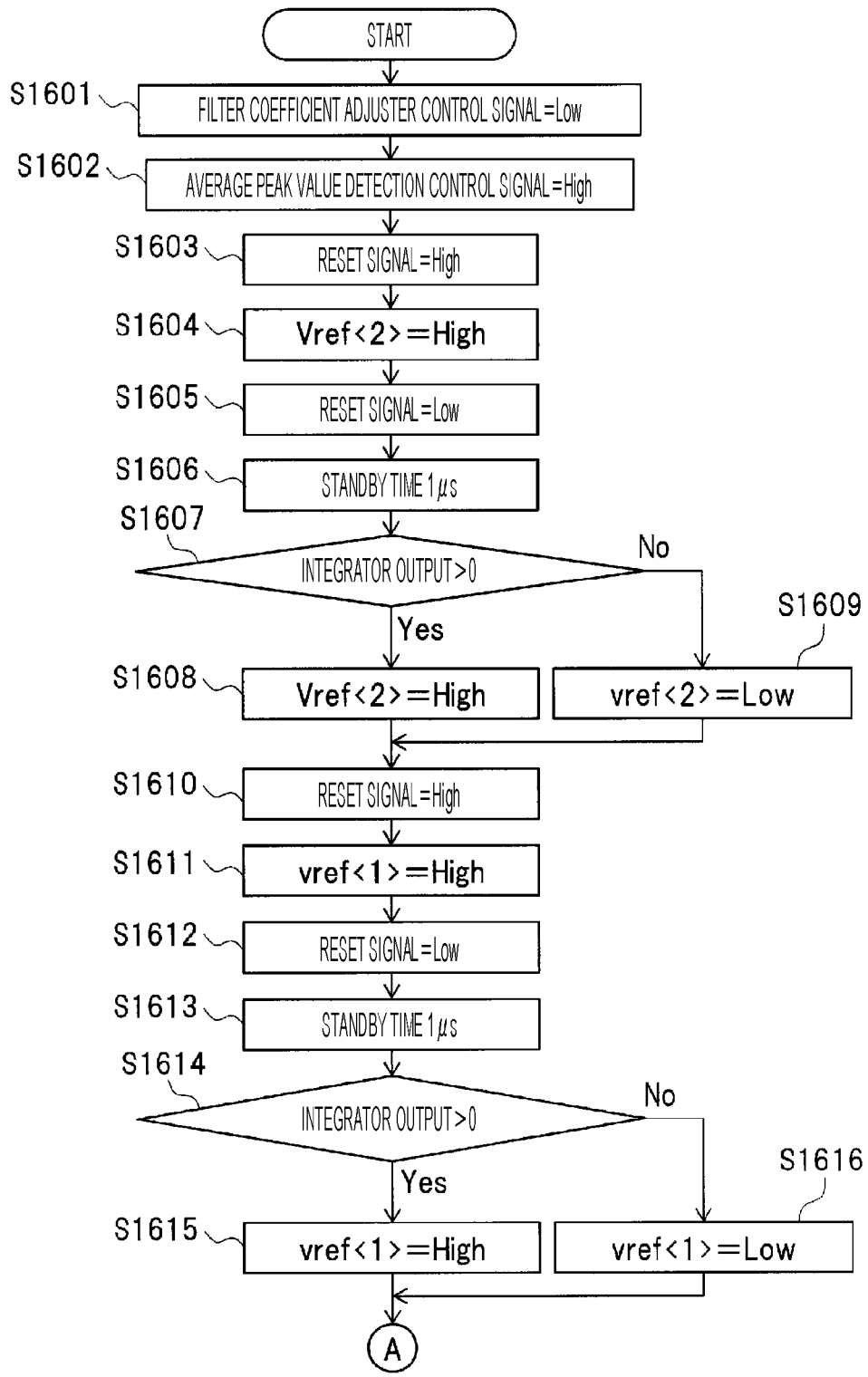
FIG. 16 is a diagram illustrating an example of an operation sequence of average peak value detection in the average peak value detector in FIG. 15.
Figure 17:
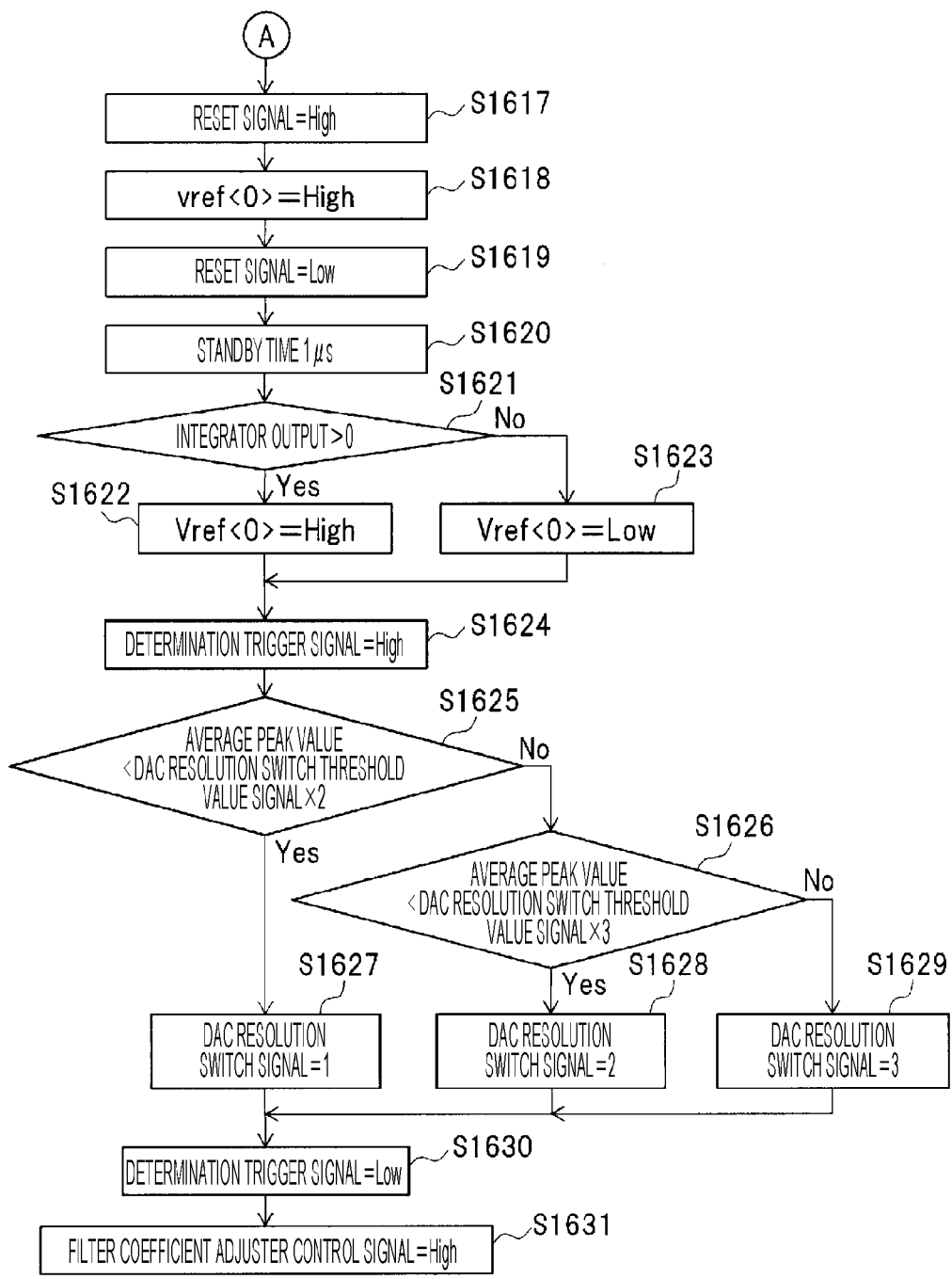
FIG. 17 is a diagram illustrating an example of an operation sequence of average peak value detection, continuous to FIG. 16.

Next, an operation of the average peak value detection in the average peak value detector 901 will be described using FIGS. 16 and 17. FIGS. 16 and 17 are diagrams illustrating an example of an operation sequence of the average peak value detection. Here, as an example of the average peak value detection, the average peak value 904 is set to a signal Vref<2:0> of three bits.

First, the control circuit 803 sets the filter coefficient adjuster control signal 809 to Low and stops the update of the tap coefficients. Then, the control circuit 803 sets the average peak value detection control signal 805 to High and starts the average peak value detection in the average peak value detector 901 (S1601 and S1602).

Then, the control circuit 1506 in the average peak value detector 901 sets the reset signal 1512 to High and resets the integrator 1505 with the reset (S1603). Then, the control circuit 1506 sets a most significant bit Vref<2> of the average peak value 904 to High, sets the reset signal 1512 to Low, and starts an operation of the integrator 1505 with the reset (S1604 and S1605). After a constant time (S1606, here, a standby time is set to 1 μs, for example), if the integrator output 1511 is positive (S1607—Yes), the control circuit 1506 sets Vref<2> to High (S1608). If the integrator output 1511 is negative (S1607—No), the control circuit 1506 sets Vref<2> to Low (S1609).

Next, the control circuit 1506 sets the reset signal 1512 to High and resets the integrator 1505 with the reset (S1610). Then, the control circuit 1506 sets a second bit Vref<1> of the average peak value 904 to High, sets the reset signal 1512 to Low, and starts the operation of the integrator 1505 with the reset (S1611 and S1612). After a constant time (S1613, 1 μs), if the integrator output 1511 is positive (S1614—Yes), the control circuit 1506 sets Vref<1> to High (S1615). If the integrator output 1511 is negative (S1614—No), the control circuit 1506 sets Vref<1> to Low (S1616).

Next, the control circuit 1506 sets the reset signal 1512 to High and resets the integrator 1505 with the reset (S1617). Then, the control circuit 1506 sets a third bit Vref<0> of the average peak value 904 to High, sets the reset signal 1512 to Low, and starts the operation of the integrator 1505 with the reset (S1618 and S1619). After a constant time (S1620, 1 μs), if the integrator output 1511 is positive (S1621—Yes), the control circuit 1506 sets Vref<0> to High (S1622). If the integrator output 1511 is negative (S1621—No), the control circuit 1506 sets Vref<0> to Low (S1623).

Then, the control circuit 803 switches the determination trigger signal 807 from Low to High and the comparator 902 compares the average peak value 904 and the DAC resolution switch threshold value signal 806 (S1624). As a comparison result, if the average peak value 904 is smaller than twice the DAC resolution switch threshold value signal 806 (S1625—Yes), the DAC resolution switch signal 802 is set to 1 (S1627). If the average peak value 904 is larger than twice the DAC resolution switch threshold value signal 806 and smaller than triple the DAC resolution switch threshold value signal 806 (S1625—No and S1626—Yes), the DAC resolution switch signal 802 is set to 2 (S1628). If the average peak value 904 is larger than triple the DAC resolution switch threshold value signal 806 (S1626—No), the DAC resolution switch signal 802 is set to 3 (S1629).

Then, the control circuit 803 sets the determination trigger signal 807 to Low, sets the filter coefficient adjuster control signal 809 to High, and starts the update of the tap coefficients to be stopped (S1630 and S1631).

Effects of First Embodiment

According to the electric signal transmission apparatus according to the first embodiment described above, the average peak value determiner 801 and the control circuit 803 are added to the DFE 313 and the following effects can be obtained.

(1) The DFE 313 has the average peak value determiner 801, detects the average peak value based on the output of the adder 402, and compares a magnitude relation of the detected average peak value and the threshold value. As a comparison result, when the average peak value is larger than the threshold value, the reference value of the output of the reference value generation circuit 711 is increased from the initial value set by the program and the resolutions of the DACs 706 to 710 are caused to become coarse from the initial value. As a result, control can be executed to widen the output ranges of the DACs 706 to 710. In contrast, when the average peak value is smaller than the threshold value, the reference value of the output of the reference value generation circuit 711 is decreased from the initial value set by the program and the resolutions of the DACs 706 to 710 are caused to become fine from the initial value. As a result, control can be executed to narrow the output ranges of the DACs 706 to 710.

(2) The DFE 313 has the control circuit 803 and the update of the tap coefficients of the filters in the DFE 313 can be stopped until the average peak value is detected and the resolutions of the DACs 706 to 710 are switched. In addition, after the resolutions, of the DACs 706 to 710 are switched, the update of the tap coefficients of the filters to be stopped can be started.

(3) The average peak value detector 901 in the average peak value determiner 801 has the ADC 1101, the multiplier 1102, the subtracter 1103, the integrator 1104, and the feedback loop from the output of the integrator 1104 to the input of the subtracter 1103. The feedback loop operates such that the DFE peak value 1105 to be the input to the subtracter 1103 and the average peak value 904 to be the output from the integrator 1104 are matched and averaging is performed. Therefore, the average peak value of the DFE 313 can be detected.

(4) The average peak value detector 901 in the average peak value determiner 801 has the multiplier 1201, the DAC 1202, the comparator 1203, the integrator 1205, and the feedback loop from the output of the integrator 1205 to the input of the multiplier 1201. The feedback loop operates such that the value obtained by converting the average peak value 904 into the analog value by the DAC 1202 and the average value of the DFE sample-and-hold output 718 are matched and the average peak value of the DFE 313 can be detected. This configuration is preferably applied to the case in which the high-speed ADC cannot be used.

(5) The average peak value detector 901 in the average peak value determiner 801 has the multiplier 1501, the DAC 1502, the comparator 1503, the integrator 1505, the control circuit 1506, and the feedback loop from the output of the control circuit 1506 to the input of the multiplier 1501. By the feedback loop, each peak of the average peak value 904 is set to High sequentially from the upper bit, the magnitudes of the average peak value 904 and the average value of the DFE sample-and--hold output 718 are compared, and the value of each peak is fixed sequentially from the upper bit, so that the average peak value can be detected. This configuration is preferably applied to the case in which the average peak value is detected using the binary search.

(6) Control can be executed to widen the output ranges of the DACs 706 to 710 (widen the ranges) or narrow the output ranges (narrow the ranges) by (1). Therefore, the difference of the transmission path can be controlled flexibly without increasing the number of bits in the DACs 706 to 710. That is, in the transmission path in which the input peak value of the DFE 313 is large, it is possible to correspond to the large tap coefficients by widening the output ranges of the DACs 706 to 710. In contrast, in the transmission path in which the input peak value of the DFE 313 is small, it is possible to correspond to the request for the low quantization noise by decreasing the resolutions of the DACs 706 to 710. As a result, the resolutions and the ranges of the DACs 706 to 710 can be optimized in accordance with the difference of the transmission path and the increase in the area or the consumption power can be suppressed while the transmission path is controlled flexibly.

Second Embodiment

An electric signal transmission apparatus according to a second embodiment will be described using FIGS. 18 to 22. The electric signal transmission apparatus according to the second embodiment is different from the electric signal transmission apparatus according to the first embodiment in that, in a decision feedback equalizer (DFE), switching of gain of a filter coefficient adjuster as well as switching of resolutions of DACs is performed and tap coefficient convergence loop gain is adjusted. Hereinafter, a difference with the first embodiment will be mainly described.

Decision Feedback Equalizer (DFE) According to Second Embodiment

Figure 18:
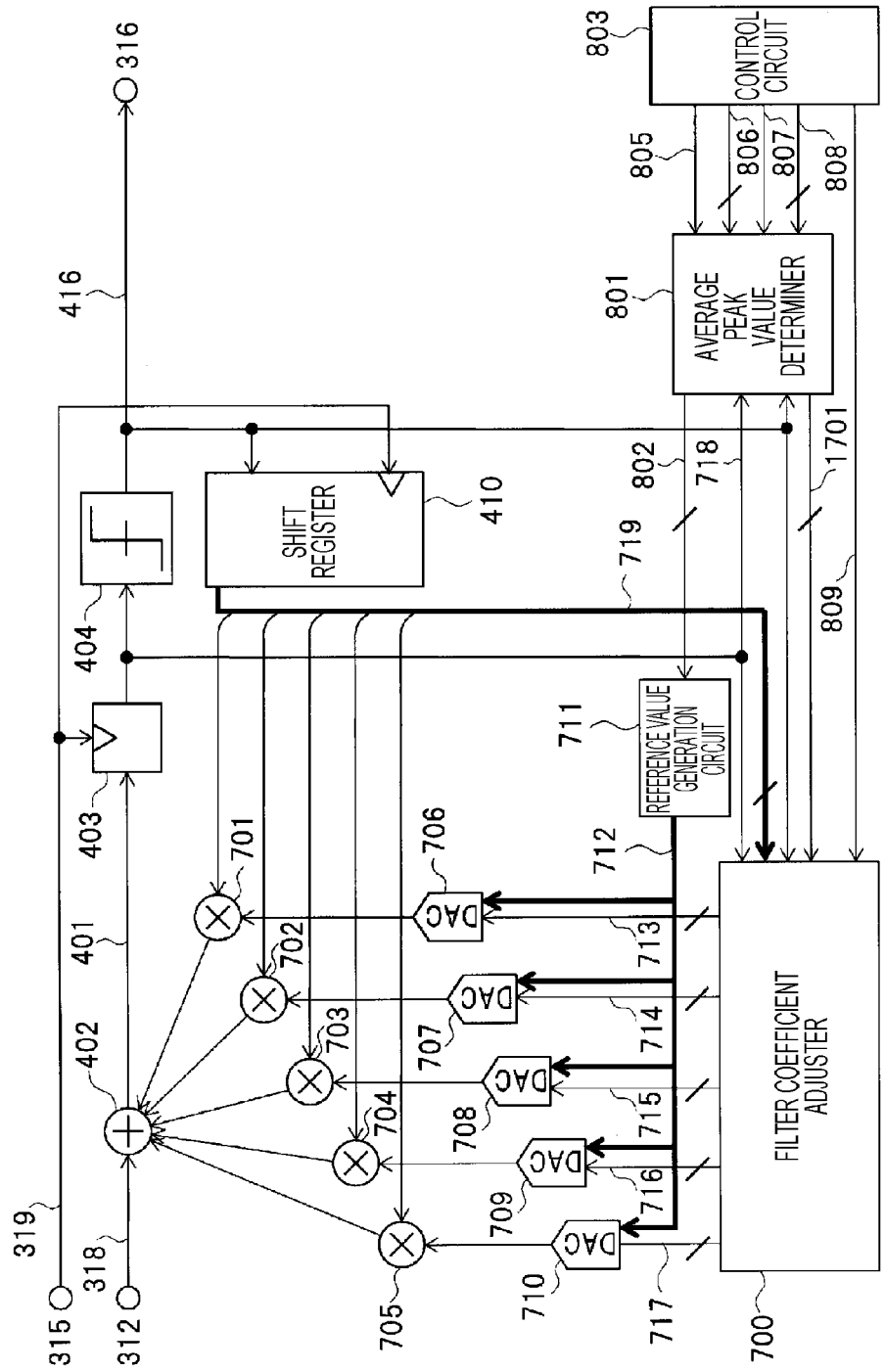
FIG. 18 is a diagram illustrating an example of a configuration of a decision feedback equalizer in a receiver in an electric signal transmission apparatus according to a second embodiment of the present invention.

First, a DFE 313 according to the second embodiment will be described using FIG. 18. FIG. 18 is a diagram illustrating an example of a configuration of the DFE 313 according to the second embodiment.

The DFE 313 according to the second embodiment is obtained by adding a gain switch signal 1701 output from an average peak value determiner 801 to a filter coefficient adjuster 700 to the configuration of FIG. 8 according to the first embodiment.

<Average Peak Value Determiner>

Figure 19:
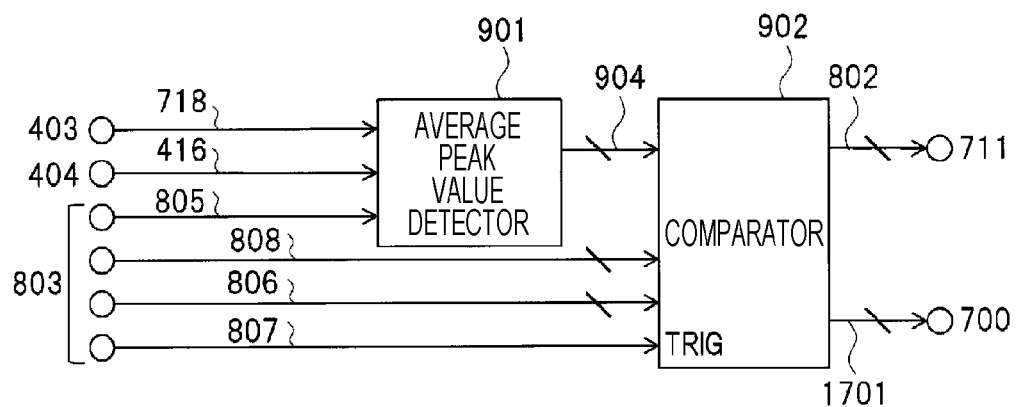
FIG. 19 is a diagram illustrating an example of a configuration of an average peak value determiner in the decision feedback equalizer in FIG. 18.

Next, the average peak value determiner 801 in the DFE 313 will be described using FIG. 19. FIG. 19 is a diagram illustrating an example of a configuration of the average peak value determiner 801.

In the average peak value determiner 801, the gain switch signal 1701 is output from a comparator 902 in the average peak value determiner 801, with respect to the configuration of FIG. 9 according to the first embodiment. That is, the average peak value determiner 801 according to the second embodiment includes an average peak value detector 901 and the comparator 902 and the gain switch signal 1701 is output from the comparator 902 to the filter coefficient adjuster 700. The average peak value detector 901 has the same configuration as the configuration illustrated in FIGS. 12, 13, and 15.

<Filter Coefficient Adjuster>

Figure 20:
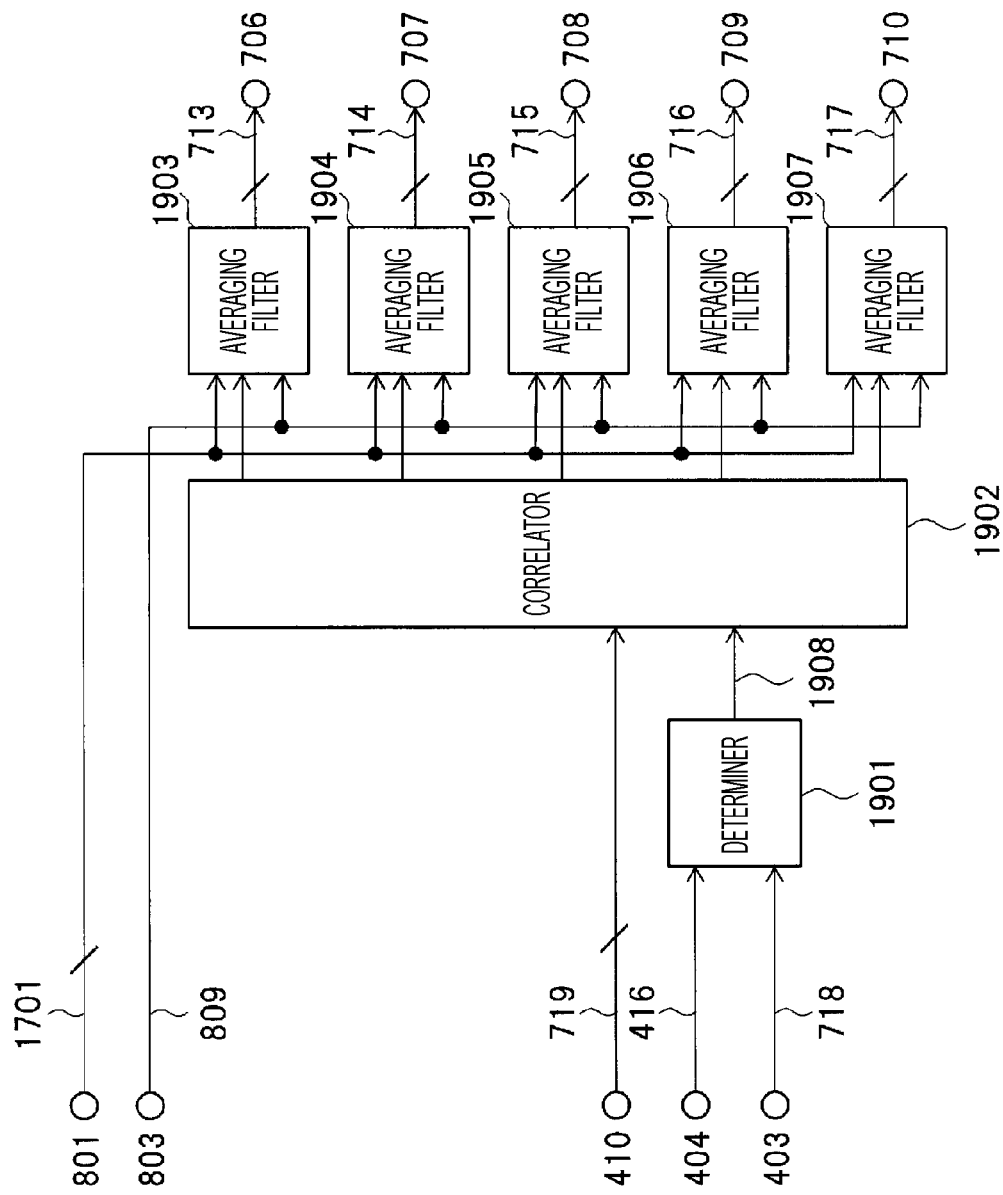
FIG. 20 is a diagram illustrating an example of a configuration of a filter coefficient adjuster in the decision feedback equalizer in FIG. 18.

Next, the filter coefficient adjuster 700 in the DFE 313 will be described using FIG. 20. FIG. 20 is a diagram illustrating an example of a configuration of the filter coefficient adjuster 700.

The filter coefficient adjuster 700 includes a determiner 1901, a correlator 1902, and averaging filters 1903, 1904, 1905, 1906, and 1907.

The determiner 1901 receives a DFE sample-and-hold output 718 and DFE output data 416 and determines whether a peak value is larger or smaller than a target peak value set by a program. A configuration of the determiner 1901 will be described below using FIG. 21. A determination result 1908 of an output of the determiner 1901 is input to the correlator 1902 and is correlated with a delayed data string 719 of a DFE output.

A correlation result of data before one clock in the DFE output data 416 and the determination result 1908 is input to the averaging filter 1903 and a tap 1 coefficient code 713 is output. Likewise, data before 2 to 5 clocks in the DFE output data 416 and the determination result 1908 are correlated, correlation results are input to the averaging filters 1904 to 1907, respectively, averaging is performed, and tap 2 to 5 coefficient codes 714 to 717 are output. In the DFE 313, tap coefficients are converged by a feedback loop and each tap coefficient is converged such that an average value of the determination result 1908 approaches 0.

Values of the averaging filters 1903 to 1907 are updated during a period where the filter coefficient adjuster control signal 809 is High. If the gain switch signal 1701 output from the comparator 902 in the average peak value determiner 801 becomes high, an operation is executed such that gain is decreased by increasing the number of times of averaging. In contrast, if the gain switch signal 1701 becomes low, an operation is executed such that the gain is increased by decreasing the number of times of averaging.

<Determiner>

Figure 21:
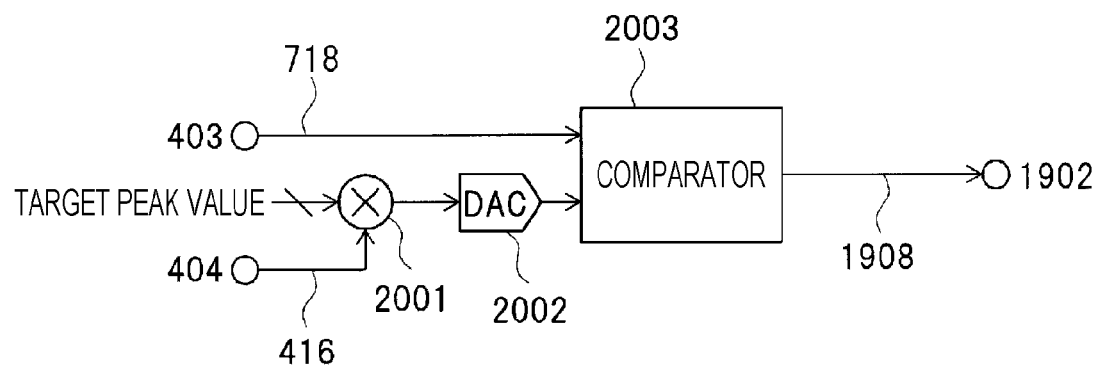
FIG. 21 is a diagram illustrating an example of a configuration of a determiner in the filter coefficient adjuster in FIG. 20.

Next, the determiner 1901 in the filter coefficient adjuster 700 will be described using FIG. 21. FIG. 21 is a diagram illustrating an example of a configuration of the determiner 1901.

The determiner 1901 includes a multiplier 2001, a DAC 2002, and a comparator 2003. The DFE output data 416 is multiplied by a target peak value set by a program in the multiplier 2001 and is converted into an analog voltage in the DAC 2002. The magnitudes of an output from the DAC 2002 and the DFE sample-and-hold output 718 are compared in the comparator 2003. When the DFE sample-and-hold output 718 is larger than the output of the DAC 2002, +1 is output and when the DFE sample-and-hold output 718 is smaller than the output of the DAC 2002, −1 is output.

<Operation of Average Peak Value Detection>

Next, an operation of the average peak value detection in the DFE 313 will be described using FIG. 22. FIG. 22 is a diagram illustrating an example of an operation sequence of the average peak value detection.

First, the control circuit 803 sets the filter coefficient adjuster control signal 809 to Low and stops the update of the tap coefficients. Then, the control circuit 803 sets the average peak value detection control signal 805 to High and starts the average peak value detection in the average peak value detector 901 (S2101 and S2102). Then, after a standby time, if the control circuit 803 switches a determination trigger signal 807 from Low to High, the comparator 902 compares the average peak value 904 and the DAC resolution switch threshold value signal 806 (S2103 and S2104).

As a comparison result, if the average peak value 904 is smaller than twice the DAC resolution switch threshold value signal 806 (S2105—Yes), the DAC resolution switch signal 802 is set to 1 and the gain switch signal 1701 is set to 1 (S2107). If the average peak value 904 is larger than twice the DAC resolution switch threshold value signal 806 and smaller than triple the DAC resolution switch threshold value signal 806 (S2105—No and S2106—Yes), the DAC resolution switch signal 802 is set to 2 and the gain switch signal 1701 is set to 2 (S2108). If the average peak value 904 is larger than triple the DAC resolution switch threshold value signal 806 (S2106—No), the DAC resolution switch signal 802 is set to 3 and the gain switch signal 1701 is set to 3 (S2109).

Then, the control circuit 803 sets the determination trigger signal 807 to Low, sets the filter coefficient adjuster control signal 809 to High, and starts the update of the tap coefficients to be stopped (S2110 and S2111).

Effects of Second Embodiment

According to the electric signal transmission apparatus according to the second embodiment described above, in addition to the same effects ((1) to (6)) as the effects of the first embodiment, the following different effects can be obtained.

(11) The gain switch signal 1701 output from the average peak value determiner 801 to the filter coefficient adjuster 700 is added to the DFE 313. Thereby, the tap coefficient convergence loop gain can be adjusted by performing switching of the gain of the filter coefficient adjuster 700 as well as switching of the resolutions of the DACs 706 to 710. As a result, the resolutions of the DACs 706 to 710 are switched and the gain of the filter coefficient adjuster 700 is switched in a direction opposite to an increase/decrease direction of the resolutions, so that a change in the gain of the tap coefficient convergence loop of the filters can be suppressed.

(12) The DFE 313 has the control circuit 803 and can stop the update of the tap coefficients of the filters in the DFE 313, until the average peak value is detected, the resolutions of the DACs 706 to 710 are switched, and the gain of the filter coefficient adjuster 700 is switched. After the resolutions of the DACs 706 to 710 are switched and the gain of the filter coefficient adjuster 700 is switched, the update of the tap coefficients of the filters to be stopped can be started.

The invention devised by the present inventors has been described specifically on the basis of the embodiments. However, it is needless to say that the present invention is not limited to the embodiments described above and various changes can be made without departing from the scope of the present invention. For example, the embodiments are described in detail to facilitate the understanding of the present invention and the present invention is not limited to embodiments in which all of the described configurations are included. In addition, a part of the configurations of the certain embodiment can be replaced by the configurations of other embodiment or the configurations of other embodiment can be added to the configurations of the certain embodiment. In addition, for a part of the configurations of the individual embodiments, addition, removal, and replacement of other configurations can be performed.

REFERENCE SIGNS LIST 101 intra-apparatus substrate
102 semiconductor integrated circuit device for signal processing
103 semiconductor integrated circuit device for communication
104 connector
201 intra-apparatus substrate
202 intra-apparatus transmission path substrate
203 intra-apparatus substrate
204 semiconductor integrated circuit device for signal processing
205 repeater
206 repeater
207 semiconductor integrated circuit device for communication
208 connector
209 connector
210 connector
301 semiconductor integrated circuit device
302 transmission path
303 semiconductor integrated circuit device
304 transmitter
305 signal processing unit
306 parallel-to-serial converter
307 FFE
309 PLL
310 receiver
311 signal processing unit
312 CTLE
313 DFE
314 PLL
315 CDR
316 serial-to-parallel converter
318 CTLE output
319 DFE clock
401 DFE tap addition output
402 adder
403 sample-and-hold circuit
404 comparator
405 tap 1 variable amplifier
406 tap 2 variable amplifier
407 tap 3 variable amplifier
408 tap 4 variable amplifier
409 tap 5 variable amplifier
410 shift register
411 flip-flop
412 flip-flop
413 flip-flop
414 flip-flop
415 flip-flop
416 DFE output data
501 tap 1
502 tap 2
503 tap 3
504 tap 4
505 tap 5
700 filter coefficient adjuster
701 multiplier
702 multiplier
703 multiplier
704 multiplier
705 multiplier
706 DAC
707 DAC
708 DAC
709 DAC
710 DAC
711 reference value generation circuit
712 reference value
713 tap 1 coefficient code
714 tap 2 coefficient code
715 tap 3 coefficient code
716 tap 4 coefficient code
717 tap 5 coefficient code
718 DFE sample-and-hold output
719 delayed data string
801 average peak value determiner
802 DAC resolution switch signal
803 control circuit
805 average peak value detection control signal
806 DAC resolution switch threshold value signal
807 determination trigger signal
808 DAC resolution switch signal initial value
809 filter coefficient adjuster control signal
901 average peak value detector
902 comparator
904 average peak value
1001 reference current source
1002 current source circuit
1003 current mirror circuit
1004 current mirror circuit
1005 current mirror circuit
1006 switch
1007 switch
1008 switch
1009 current source circuit
1101 ADC
1102 multiplier
1103 subtracter
1104 integrator
1105 DFE peak value
1201 multiplier
1202 DAC
1203 comparator
1204 multiplier
1205 integrator
1208 average output voltage
1210 peak value comparison result
1501 multiplier
1502 DAC
1503 comparator
1504 multiplier
1505 integrator with reset
1506 control circuit
1508 DAC output 1509 comparator output
1510 multiplier output
1511 integrator output
1512 reset signal
1701 gain switch signal
1901 determiner
1902 correlator
1903 averaging filter
1904 averaging filter
1905 averaging filter
1906 averaging filter
1907 averaging filter
1908 determination result
2001 multiplier
2002 DAC
2003 comparator

The invention claimed is:

1. An electric signal transmission apparatus having a decision feedback equalizer,
wherein the decision feedback equalizer has
an adder that receives a reception signal and adds taps of filters to the reception signal,
a comparator that determines the positive/negative of an output of the adder and outputs a determination result,
a shift register that delays an output of the comparator by the integral multiple of a cycle of an input clock,
a reference circuit that switches a reference value of an output according to an input control signal,
digital-to-analog converters that execute digital-to-analog conversion on tap coefficients of the filters,
multipliers that output the taps of the filters obtained by multiplying outputs of the digital-to-analog converters and an output of the shift register to the adder,
a filter coefficient adjuster that receives the output of the adder, the output of the comparator, and the output of the shift register, outputs the tap coefficients of the filters to the digital-to-analog converters, and adjusts the tap coefficients of the filters by a feedback loop, and
an average peak value determiner that receives the output of the adder and a threshold value set by a program, outputs a determination result as a control signal to the reference circuit, detects an average peak value of the output of the adder, compares a magnitude relation of the detected average peak value and the threshold value, increases the reference value of the output of the reference circuit from an initial value set by the program and causes resolutions of the digital-to-analog converters to become coarse from the initial value, when the average peak value is larger than the threshold value, and decreases the reference value of the output of the reference circuit from the initial value set by the program and causes the resolutions of the digital-to-analog converters to become fine from the initial value, when the average peak value is smaller than the threshold value.

2. The electric signal transmission apparatus according to claim 1, wherein
the decision feedback equalizer further has a controller that stops the update of the tap coefficients of the filters in the decision feedback equalizer, until the average peak value is detected and the resolutions of the digital-to-analog converters are switched.

3. The electric signal transmission apparatus according to claim 1, wherein
the average peak value determiner has an average peak value detector that detects the average peak value and a first comparator that compares a magnitude relation of the average peak value detected by the average peak value detector and the threshold value, and
the average peak value detector has an analog-to-digital converter that executes analog-to-digital conversion on the output of the adder, a first multiplier that multiplies an output of the analog-to-digital converter and the output of the comparator, a subtracter that subtracts the output of the average peak value detector from an output of the first multiplier, an integrator that integrates an output of the subtracter and has a function of varying gain, and a feedback loop that inputs an output of the integrator as the output of the average peak value detector to the subtracter, subtracts the output from the output of the first multiplier, and detects the average peak value.

4. The electric signal transmission apparatus according to claim 1, wherein
the average peak value determiner has an average peak value detector that detects the average peak value and a first comparator that compares a magnitude relation of the average peak value detected by the average peak value detector and the threshold value, and
the average peak value detector has a first multiplier that multiplies an output of the average peak value detector and the output of the comparator, a first digital-to-analog converter that executes digital-to-analog conversion on an output of the first multiplier, a first comparator that compares the magnitudes of an output of the first digital-to-analog converter and the output of the adder, an integrator that integrates an output of the first comparator and has a function of varying gain, and a feedback loop that inputs an output of the integrator as the output of the average peak value detector to the first multiplier and detects the average peak value.

5. The electric signal transmission apparatus according to claim 1, wherein
the average peak value determiner has an average peak value detector that detects the average peak value and a first comparator that compares a magnitude relation of the average peak value detected by the average peak value detector and the threshold value, and
the average peak value detector has a first multiplier that multiplies an output of the average peak value detector and an output of the comparator, a first digital-to-analog converter that executes digital-to-analog conversion on an output of the first multiplier, a first comparator that compares the magnitudes of an output of the first digital-to-analog converter and the output of the adder, an integrator that integrates an output of the first comparator and has a function of varying gain, a controller that executes control, on the basis of an output of the integrator, and a feedback loop that inputs an output of the average peak value detector output from the controller to the first multiplier, executes a binary search for setting each bit of the output of the average peak value detector to High sequentially from a most significant bit, determining the positive/negative of a comparison result of the average peak value detector, and fixing each bit of the output of the average peak value detector sequentially from the most significant bit, and detects the average peak value.

6. The electric signal transmission apparatus according to claim 1, wherein
the average peak value determiner switches the resolutions of the digital-to-analog converters and switches gain of the filter coefficient adjuster in a direction opposite to an increase/decrease direction of the resolutions, thereby suppressing gain of a tap coefficient convergence loop of the filters from changing.

7. The electric signal transmission apparatus according to claim 6, wherein
the decision feedback equalizer further has a controller that stops the update of the tap coefficients of the filters in the decision feedback equalizer, until the average peak value is detected, the resolutions of the digital-to-analog converters are switched, and the gain of the filter coefficient adjuster is switched.

8. The electric signal transmission apparatus according to claim 1, wherein
the electric signal transmission apparatus has a receiver that has the decision feedback equalizer, and
the receiver has a reception-side equalizer that amplifies a signal received via a transmission path to increase gain of a high frequency side, the decision feedback equalizer that executes filter processing on an inter-symbol interference component and a reflection component with respect to an output signal of the reception-side equalizer, a recovery circuit that detects an edge from the output signal of the decision feedback equalizer and adjusts a phase of a clock, a reception-side PLL circuit that supplies the clock to synchronize the phase to the recovery circuit, and a serial-to-parallel converter that converts a signal sampled and held by the decision feedback equalizer into a plurality of delayed signals.

9. The electric signal transmission apparatus according to claim 8, wherein
the electric signal transmission apparatus has transmitter that transmits the signal received by the receiver via the transmission path, and
the transmitter has a parallel-to-serial converter that converts the signal to be transmitted from parallel transmission to serial transmission, a transmission-side equalizer that equalizes a waveform of an output signal of the parallel-to-serial converter to decrease gain of a low frequency side, and a transmission-side PLL circuit that supplies the clock to synchronize the phase to the transmission-side equalizer.

10. An electric signal transmission apparatus having a transmitter transmitting a transmission signal, a transmission path transmitting the signal transmitted from the transmitter, and a receiver receiving the signal transmitted via the transmission path,
wherein the receiver has a decision feedback equalizer, and
the decision feedback equalizer has an adder that receives a reception signal and adds taps of filters to the reception signal, a comparator that determines the positive/negative of an output of the adder and outputs a determination result, a shift register that delays an output of the comparator by the integral multiple of a cycle of an input clock, a reference circuit that switches a reference value of an output according to an input control signal, digital-to-analog converters that execute digital-to-analog conversion on tap coefficients of the filters, multipliers that output the taps of the filters obtained by multiplying outputs of the digital-to-analog converters and an output of the shift register to the adder, a filter coefficient adjuster that receives the output of the adder, the output of the comparator, and the output of the shift register, outputs the tap coefficients of the filters to the digital-to-analog converters, and adjusts the tap coefficients of the filters by a feedback loop, and an average peak value determiner that receives the output of the adder and a threshold value set by a program, outputs a determination result as a control signal to the reference circuit, detects an average peak value of the output of the adder, compares a magnitude relation of the detected average peak value and the threshold value, increases the reference value of the output of the reference circuit from an initial value set by the program and causes resolutions of the digital-to-analog converters to become coarse from the initial value, when the average peak value is larger than the threshold value, and decreases the reference value of the output of the reference circuit from the initial value set by the program and causes the resolutions of the digital-to-analog converters to become fine from the initial value, when the average peak value is smaller than the threshold value.

11. The electric signal transmission apparatus according to claim 10, wherein
the decision feedback equalizer further has a controller that stops the update of the tap coefficients of the filters in the decision feedback equalizer, until the average peak value is detected and the resolutions of the digital-to-analog converters are switched.

12. The electric signal transmission apparatus according to claim 10, wherein
the average peak value determiner switches the resolutions of the digital-to-analog converters and switches gain of the filter coefficient adjuster in a direction opposite to an increase/decrease direction of the resolutions, thereby suppressing gain of a tap coefficient convergence loop of the filters from changing.

13. The electric signal transmission apparatus according to claim 12, wherein
the decision feedback equalizer further has a controller that stops the update of the tap coefficients of the filters in the decision feedback equalizer, until the average peak value is detected, the resolutions of the digital-to-analog converters are switched, and the gain of the filter coefficient adjuster is switched.

14. The electric signal transmission apparatus according to claim 10, wherein
the transmitter is formed of a first semiconductor integrated circuit device and the receiver is formed of a second semiconductor integrated circuit device different from the first semiconductor integrated circuit device.

* * * * *